(12) United States Patent
Xu et al.

(10) Patent No.: US 12,010,340 B2
(45) Date of Patent: Jun. 11, 2024

(54) INTRA BLOCK COPY SEARCH RANGE

(71) Applicant: Tencent America LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/962,347

(22) Filed: Oct. 7, 2022

(65) Prior Publication Data
US 2023/0041646 A1    Feb. 9, 2023

Related U.S. Application Data

(63) Continuation of application No. 17/076,741, filed on Oct. 21, 2020, now Pat. No. 11,516,504, which is a
(Continued)

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/176* (2014.11); *H04N 19/186* (2014.11); *H04N 19/423* (2014.11)

(58) Field of Classification Search
None
See application file for complete search history.

(56) References Cited

U.S. PATENT DOCUMENTS

| 10,027,981 B2 | 7/2018 | Xu et al. |
| 10,075,712 B2 | 9/2018 | Liu et al. |

(Continued)

FOREIGN PATENT DOCUMENTS

| AU | 2013270596 A1 | 7/2015 |
| CN | 105532000 A | 4/2016 |

(Continued)

OTHER PUBLICATIONS

Japanese Office Action dated Jan. 4, 2022 in Application No. 2021-512374 with English Translation.
(Continued)

*Primary Examiner* — Christopher G Findley
(74) *Attorney, Agent, or Firm* — ARENTFOX SCHIFF LLP

(57) ABSTRACT

Aspects of the disclosure provide methods and apparatuses for video encoding. In some examples, an apparatus includes processing circuitry that identifies a reference sub-block in a previously reconstructed block of a picture. The processing circuitry determines whether reconstructed samples of the reference sub-block are included in an intra block copy search range according to a position of a current sub-block in a current block of the picture. The processing circuitry determines whether the reference sub-block is valid based on the reconstructed samples of the reference sub-block being determined as included in the intra block copy search range according to the position of the current sub-block. The processing circuitry further encodes the current sub-block based on the reconstructed samples of the reference sub-block in response to the reference sub-block being determined as valid.

20 Claims, 15 Drawing Sheets

Related U.S. Application Data continuation of application No. 16/419,235, filed on May 22, 2019, now Pat. No. 10,848,782.

(60) Provisional application No. 62/735,002, filed on Sep. 21, 2018.

(51) Int. Cl.
*H04N 19/176* (2014.01)
*H04N 19/186* (2014.01)
*H04N 19/423* (2014.01)

(56) References Cited

U.S. PATENT DOCUMENTS

| | | | |
|---|---|---|---|
| 10,555,001 | B2 | 2/2020 | Liu et al. |
| 10,666,968 | B2 | 5/2020 | Xu et al. |
| 10,848,782 | B2 | 11/2020 | Xu et al. |
| 2007/0110325 | A1 | 5/2007 | Lee |
| 2009/0003446 | A1 | 1/2009 | Wu et al. |
| 2013/0058405 | A1 | 3/2013 | Zhao et al. |
| 2013/0094805 | A1 | 4/2013 | Zhou et al. |
| 2015/0063440 | A1 | 3/2015 | Pang et al. |
| 2015/0208084 | A1 | 7/2015 | Zhu et al. |
| 2015/0256850 | A1 | 9/2015 | Kottke et al. |
| 2015/0271517 | A1* | 9/2015 | Pang ............... H04N 19/52 |
| 2015/0296213 | A1 | 10/2015 | Hellman |
| 2015/0334405 | A1 | 11/2015 | Rosewarne et al. |
| 2015/0373358 | A1 | 12/2015 | Pang et al. |
| 2015/0373366 | A1 | 12/2015 | He et al. |
| 2016/0100163 | A1 | 4/2016 | Rapaka et al. |
| 2016/0219298 | A1 | 7/2016 | Li et al. |
| 2016/0227244 | A1 | 8/2016 | Rosewarne |
| 2016/0241868 | A1 | 8/2016 | Li et al. |
| 2016/0241875 | A1 | 8/2016 | Wu et al. |
| 2016/0255359 | A1 | 9/2016 | Yu et al. |
| 2016/0353117 | A1 | 12/2016 | Seregin et al. |
| 2017/0094271 | A1 | 3/2017 | Liu et al. |
| 2017/0099490 | A1 | 4/2017 | Seregin et al. |
| 2017/0195677 | A1 | 7/2017 | Ye et al. |
| 2017/0238001 | A1 | 8/2017 | Li et al. |
| 2017/0295370 | A1 | 10/2017 | Xu et al. |
| 2017/0302951 | A1 | 10/2017 | Joshi et al. |
| 2017/0310961 | A1 | 10/2017 | Liu et al. |
| 2018/0048909 | A1 | 2/2018 | Liu et al. |
| 2018/0131963 | A1 | 5/2018 | Chuang et al. |
| 2018/0288430 | A1 | 10/2018 | Chen et al. |
| 2019/0222859 | A1 | 7/2019 | Chuang et al. |
| 2020/0021798 | A1 | 1/2020 | Xu et al. |
| 2020/0029072 | A1 | 1/2020 | Xu et al. |
| 2020/0099953 | A1 | 3/2020 | Xu et al. |

FOREIGN PATENT DOCUMENTS

| | | |
|---|---|---|
| CN | 105659602 A | 6/2016 |
| CN | 105765974 A | 7/2016 |
| CN | 105917648 A | 8/2016 |
| CN | 106134196 A | 11/2016 |
| CN | 106416243 A | 2/2017 |
| CN | 106464874 A | 2/2017 |
| CN | 106464896 A | 2/2017 |
| CN | 107018418 A | 8/2017 |
| CN | 107079161 A | 8/2017 |
| CN | 107615765 A | 1/2018 |
| CN | 107646195 A | 1/2018 |
| CN | 107787583 A | 3/2018 |
| CN | 112913250 A | 6/2021 |
| EP | 3058739 A1 | 8/2016 |
| EP | 3180917 B1 | 6/2017 |
| EP | 3763126 A1 | 1/2021 |
| JP | 2016534660 A | 3/2015 |
| JP | 2016539542 A | 12/2016 |
| JP | 2017525267 A | 8/2017 |
| JP | 7152516 B2 | 10/2022 |
| KR | 20160072181 A | 6/2016 |
| KR | 20170019364 A | 2/2017 |
| KR | 20170063885 A | 6/2017 |
| RU | 2654129 C2 | 5/2018 |
| RU | 2679201 C2 | 2/2019 |
| WO | 2015054811 A1 | 4/2015 |
| WO | 2015143346 A1 | 9/2015 |
| WO | 2017190288 A1 | 11/2017 |
| WO | 2020113156 A1 | 6/2020 |

OTHER PUBLICATIONS

Alshina E et al, "Ahg5: Intra block copy within one LCU", 15 JCT-VC Meeting; Oct. 23, 2013-Nov. 1, 2013; Geneva; (Joint Collaborate Team on Video Coding of ISO/IEC JTC1/SC29/WG11 and ITU-T SG.16), No. JCTVC-O0074, Oct. 26, 2013.

Zhou, Minhua, SCCE1: Cross-verification of test1.2 results, Joint Collaborative Team on Video Coding (JCT-VC) of ITU-T SG 16 WP 3 and ISO / IEC JTC 1 / SC 29/WG 11 18th Meeting: Sapporo, JP, Jun. 30-Jul. 9, 2014, JCTVC-R0211], JCTVC-R0211 (version 1), ITU-T, Jun. 21, 2014.

Pang, Chao et al., Non-RCE3: Intra Motion Compensation with 2-D MVs, Joint Collaborative Team on Video Coding (JCT-VC) of ITU-T SG 16 WP 3 and ISO / IEC JTC 1 / SC 29/WG 11 14th Meeting: Vienna, AT, Jul. 25-Aug. 2, 2013, [JCTVC-N0256], JCTVC-N0256 (version 3), ITU-T, Aug. 2, 2013.

Xu, Xiaozhong et al., CE8: CPR reference memory reuse with reduced memory requirement (CE8.1.2b and CE8.1.2c), Joint Video Experts Team (JVET) of ITU-T SG 16 WP 3 and ISO / IEC JTC 1 / SC 29/WG 11 13th Meeting: Marrakesh, MA, Jan. 9-18, 2019, [JVET-M0408-v3], JVET-M0408 (version3), ITU-T, Jan. 17, 2019.

Xu, Xiaozhong et al., Non-CE8: IBC search range increase for small CTU size, Joint Video Experts Team (JVET) of ITU-T SG 16 WP 3 and ISO / IEC JTC 1 / SC 29/WG 11 14th Meeting: Geneva, CH, Mar. 19-27, 2019, [JVET-N0384-v1], JVET-N0384 (version 1), ITU-T, Mar. 13, 2019.

Gao, Han et al., Non-CE8: IBC Reference Memory for Arbitrary CTU Size, Joint Video Experts Team (JVET) of ITU-T SG 16 WP 3 and ISO /IEC JTC 1 / SC 29/WG 11 14th Meeting: Geneva, CH, Mar. 19-27, 2019, [JVET-N0175], JVET-N0175 (version 1), ITU-T, Mar. 13, 2019.

Russian Search Report dated Jan. 18, 2022 in Application No. 2021128489/07(060310) with English Translation.

European Search Report dated Jan. 7, 2022 in Application No. 19861977.7.

Japanese Office Action dated Jan. 7, 2022 in Application No. 2020-563419 with English Translation.

Australian Office Action dated Aug. 19, 2022 in Application No. 2020238668, pp. 1-4.

Xiaozhong Xu et al.; "Intra Block Copy in HEVC Screen Content Coding Extensions"; 2016, IEEE Journal of Emerging and Selected Topics in Circuits an Systems, 11 pages.

Shan Liu et al.; "Overview of HEVC extensions on screen content coding"; Revised: Mar. 30, 2015; Industrial Technology Advances; 12 pages.

Rajan Joshi et al.; High Efficiency Video Coding (HEVC) Screen Content Coding: Draft 6; Joint Collaborative Team on Video Coding (JTC-VC) of ITU-T SG 16 WP 3 and ISO/IEC JTC 1/SC 29/WG 11, 23rd Meeting: San Diego, USA, Feb. 19-26, 2016, 673 pages.

PoLin Lai et al.; "AHG14: Intra Block Copy reference area for Wavefront Parallel Processing (WPP)"; Joint Collaborative Team on Video Coding (JTC-VC) of ITU-T SG 16 WP 3 and ISO/IEC JTC 1/SC 29/WG 11, 19th Meeting: Strasbourg, FR, Oct. 17-24, 2014, 4 pages.

Xiaozhong Xu et al.; "Block Vector Prediction in Intra Block Copy for HEVC Screen Content Coding"; 2015 Data Compression Conference; 10 pages.

Xiaozhong Xu et al.; "Non-CE2: Intra BC merge mode with default candidates"; Joint Collaborative Team on Video Coding (JTC-VC) of ITU-T SG 16 WP 3 and ISO/IEC JTC 1/SC 29/WG 11,19th Meeting: Strasbourg, FR, Oct. 17-24, 2014, 7 pages.

Yu-Chen et al.; "Improvements of HEVC SCC Palette Mode and Intra Block Copy"; Dec. 2016, IEEE Journal on Emerging and Selected Topics in Circuits and Systems, vol. 6, No. 4; 13 pages.

(56) References Cited

OTHER PUBLICATIONS

Xiaozhong Xu et al.; "On chroma motion vector derivation for intra block copy"; Joint Collaborative Team on Video Coding (JTC-VC) of ITU-T SG 16 WP 3 and ISO/IEC JTC 1/SC 29/WG 11, 21st Meeting: Warsaw, PL, Jun. 19-26, 2015, 10 pages.

Xiaozhong Xu et al.; "On reference picture list construction for intra block copy"; Joint Collaborative Team on Video Coding (JTC-VC) of ITU-T SG 16 WP 3 and ISO/IEC JTC 1/SC 29/WG 11, 21st Meeting: Warsaw, PL, Jun. 19-26, 2015; 6 pages.

Xiaozhong Xu et al.; "On storage of filtered and unfiltered current decoded pictures"; Joint Collaborative Team on Video Coding (JTC-VC) of ITU-T SG 16 WP 3 and ISO/IEC JTC 1/SC 29/WG 11, 21st Meeting: Warsaw, PL, Jun. 19-26, 2015, 2 pages.

Xiaozhong Xu et al.; "On intra block copy signaling and constraints"; Joint Collaborative Team on Video Coding (JTC-VC) of ITU-T SG 16 WP 3 and ISO/IEC JTC 1/SC 29/WG 11, 22nd Meeting: Geneva, CH, Oct. 15-21, 2015, 5 pages.

Xiaozhong Xu et al.; "DPB considerations when current picture is a reference picture"; Joint Collaborative Team on Video Coding (JTC-VC) of ITU-T SG 16 WP 3 and ISO/IEC JTC 1/SC 29/WG 11, 22nd Meeting, Geneva, CH, Oct. 15-21, 2015, 5 pages.

Xiaozhing Xu et al.; "Bug fix for DPB operations when current picture is a reference picture"; Joint Collaborative Team on Video Coding (JTC-VC) of ITU-T SG 16 WP 3 and ISO/IEC JTC 1/SC 29/WG 11, 23rd Meeting, San Diego, USA, Feb. 19-26, 2016, 5 pages.

Chun-Chi Chen et al.; "Intra Line Copy for HEVC Screen Content Coding"; 2015; IEEE Transactions on Circuits and Systems for Video Technology; 12 pages.

Jianle Chen et al.; Algorithm Description of Joint Exploration Test Model 7 (JEM 7); Joint Collaborative Team on Video Coding (JTC-VC) of ITU-T SG 16 WP 3 and ISO/IEC JTC 1/SC 29/WG 11, 7th Meeting: Torino, IT, Jul. 13-21, 2017, 48 pages.

Steffen Kamp et al.; "Decoder-Side Motion Vector Derivation for Block-Based Video Coding"; Dec. 2012, IEEE Transactions on Circuits and Systems for Video Technology, vol. 22, No. 12, 14 pages.

Shen Songwei et al.; "Deformable Motion Mode for Frame Rate Up-Conversion in Video Coding"; 2016, IEEE, 4 pages.

ITU-T Telecommunications Standardization Sector of ITU; "Series H: Audiovisual and Multimedia Systems Infrastructure of audiovisual services—Coding of moving video, High efficiency video coding", Dec. 2016, H.265, 644 pages.

Gayathri Venugopal et al.; "Intra Region-based Template Matching", Joint Collaborative Team on Video Coding (JTC-VC) of ITU-T SG 16 WP 3 and ISO/IEC JTC 1/SC 29/WG 11, 10th Meeting: San Diego, USA, Apr. 10-20, 2018, 12 pages.

Rajan Joshi et al.; "High Efficiency Video Coding (HEVC) Screen Content Coding: Draft 3"; Joint Collaborative Team on Video Coding (JTC-VC) of ITU-T SG 16 WP 3 and ISO/IEC JTC 1/SC 29/WG 11, 20th Meeting: Geneva, CH, Feb. 10-Feb. 17, 2015, 563 pages.

Rajan Joshi et al.; "Screen content coding test model 5 (SCM 5)"; Joint Collaborative Team on Video Coding (JTC-VC) of ITU-T SG 16 WP 3 and ISO/IEC JTC 1/SC 29/WG 11, 21st Meeting: Warsaw, PL, Jun. 19-26, 2015, 12 pages.

Xiaozhong Xu et al.; "Description of Core Experiment 8: Current Picture Referencing"; Joint Collaborative Team on Video Coding (JTC-VC) of ITU-T SG 16 WP 3 and ISO/IEC JTC 1/SC 29/WG 11, 11th Meeting: Ljubljana, SI, Jul. 10-18, 2018, 11 pages.

Xu, Xiaozhong et al. "CE8: CPR mode with local search ranges (Test CE8.3.1 and CE8.3.2)" Joint Video Experts Team (JVET) of ITU-T SG 16 WP 3 and ISO/IEC JTC 1/SC 29/WG 11 12th Meeting: Macao, CN, Oct. 3-12, 2018; Document: JVET-L0293-v2.

Xu, Xiaozhong et al. "CE8-related: CPR mode with local search range optimization" Joint Video Experts Team (JVET) of ITU-T SG 16 WP 3 and ISO/IEC JTC 1/SC 29/WG 11 12th Meeting: Macao, CN, Oct. 3-12, 2018; Document: JVET-L0297-v1.

Bross, Benjamin et al. "Versatile Video Coding (Draft 3" Joint Video Experts Team (JVET)of ITU-T SG 16 WP 3 and ISO/IEC JTC 1/SC 29/WG 11 12th Meeting: Macao, CN, Oct. 3-12, 2018; Document: JVET-L1001-v7.

Xu, Xiaohong et al. "CE8: CPR reference memory reuse without increasing memory requirement (CE8.1.2a and CE8.1.2d)", 13. JVET Meeting; Marrakech, MA; Jan. 9-18, 2019 (The Joint Video Exploration Team of ISO/IEC JTC1/SC29/WG11 and ITU-T SG. 16 ), Document JVET-M040717 v3.

Pham Van, Luong et al. "CE8-related: Restrictions for the search area of the IBC blocks in CPR", 12. JVET Meeting ; Macao, CN; Oct. 3-12, 2018 (The Joint Video Exploration Team of ISO/ IEC JTC1 /SC29/WG11 and ITU-T SG.16 ), Document JVET-L0404 v2.

Xu, Xiaozhong et al. "AHG16/Non-CE8: IBC search range adjustment for implementation consideration", 14. JVET Meeting; Geneva, CH Mar. 19-27, 2019 (The Joint Video Exploration Team of ISO/IEC JTC1 /SC29/WG11 and ITU-T SG.16 ), Document JVET-N0383 v1.

Xu, Jizheng et al. "Non-CE8: Intra block copy clean-up", 14. JVET Meeting; Geneva; CH, Mar. 19-27, 2019 (The Joint Video Exploration Team of ISO/IEC JTC1/SC29/WG11 and ITU-T SG. 16 ), Document JVET-N0251.

Extended European Search Report dated Nov. 17, 2021 in Application No. 20769471.2 10.

International Search Report and Written Opinion issued Nov. 1, 2019 in Application No. PCT/US2019/050564, pp. 1-9.

International Search Report and Written Opinion issued Jun. 11, 2020 in Application No. PCT/US2020/010999, pp. 1-15.

International Search Report and Written Opinion issued Mar. 19, 2020 in Application No. PCT/US2020/012367, pp. 1-15.

Korean Office Action issued Mar. 17, 2022 in Application No. 10-2021-7016000, pp. 1-20.

Korean Office Action issued Oct. 13, 2022 in Application No. 10-2020-7028693, pp. 1-17.

Korean Office Action issued Jun. 29, 2023 in Application No. 10-2022-7038862, pp. 1-15.

C. Rosewarne, et al., HEVC Range extensions test model 6 encoder description, Joint Collaborative Team on Video Coding (JCT-VC) of ITU-T SG16 WP3 and ISO/IEC JTC1/SC29/WG11, 16th Meeting: San José, US, Jan. 9-17, 2014, Document: JCTVC-P1013, pp. 1-20.

Japanese Office Action issued Nov. 14, 2023 in Application No. 2022-155791, pp. 1-9.

Japanese Office Action issued Jan. 18, 2022 in Application No. 2021-529325, pp. 1-10.

Xiaozhong Xu, Xiang Li, and Shan Liu, Non-CE8: IBC search range increase for small CTU size, Joint Video Experts Team (JVET) of ITU-T SG 16 WP 3 and ISO/IEC JTC 1/SC 29/WG 11, JVET-N0384-v2, 14th Meeting: Geneva, CH, pp. 1-4.

Xiaozhong Xu, Xiang Li, Shan Liu, and Eric Chai, CE8: Cpr reference memory reuse without increasing memory requirement (CE8.1.2a and CE8.1.2d), Joint Video Experts Team (JVET) of ITU-T SG 16 WP 3 and ISO/IEC JTC 1/SC 29/WG 11, JVET-M0407-v1, 13th Meeting: Marrakesh, MA, pp. 1-9.

Supplementary European Search Report issued Feb. 11, 2022 in Application No. 20741840.1, pp. 1-14.

Xiaozhong Xu, Xiang Li, Shan Liu, and Eric Chai, CE8: Cpr reference memory reuse without increasing memory requirement (CE8.1.2a and CE8. 1.2d), Joint Video Experts Team (JVET) of ITU-T SG 16 WP 3 and ISO/IEC JTC 1/SC 29/WVG 11, JVET-M0407-v2, 13th Meeting: Marrakesh, MA, pp. 1-9.

Chen J et al.: "Algorithm description for Versatile Video Coding and Test Model 3 (VTM 3) ", 12. Jvet Meeting; 20181003 - 20181012; Macao; (The Joint Video Exploration Team of ISO/IEC JTC1/SC29/WG11 and ITU-T SG.16), No. JVET-L1002-v1, Dec. 3, 2018, pp. 1-37.

Chinese Office Action issued Dec. 21, 2023 in Application No. 202210389660.8, pp. 1-29.

Chinese Office Action issued Dec. 11, 2023 in Application No. 202210406737.8, pp. 1-23.

Chinese Office Action issued Nov. 30, 2023 in Application No. 202210406719.X, pp. 1-21.

Chinese Office Action issued Jan. 30, 2024 in Application No. 202210398410.0, pp. 1-18.

(56) References Cited

OTHER PUBLICATIONS

Chinese Office Action issued Jan. 20, 2024 in Application No. 202210404130.6, pp. 1-17.
Chinese Office Action issued Dec. 21, 2023 in Application No. 202210399313.3, pp. 1-50.
Chinese Office Action issued Dec. 21, 2023 in Application No. 202210399292.5, pp. 1-57.
Chinese Office Action issued Nov. 30, 2023 in Application No. 202210399294.4, pp. 1-44.

* cited by examiner

FIG. 10A

INTRA BLOCK COPY SEARCH RANGE

INCORPORATION BY REFERENCE

The present application is a continuation of U.S. application Ser. No. 17/076,741 filed on Oct. 21, 2020, which is a continuation of U.S. application Ser. No. 16/419,235, filed on May 22, 2019, now U.S. Pat. No. 10,848,782, which claims the benefit of priority to U.S. Provisional Application No. 62/735,002, "Reference search range optimization for intra picture block compensation" filed on Sep. 21, 2018. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p 60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry that stores reconstructed samples of a reconstructed block of a picture in a memory. The reconstructed samples of the reconstructed block are reconstructed according to an encoded video bitstream. When a current sub-block in a current block of the picture is to be reconstructed using intra block copy (IBC) based on a reference sub-block in the reconstructed block, the processing circuitry determines whether the reconstructed samples of the reference sub-block stored in the memory are indicated as overwritten based on a position of the current sub-block, generates reconstructed samples of the current sub-block for output based on the reconstructed samples of the reference sub-block when the reconstructed samples of the reference sub-block stored in the memory are determined to be indicated as not overwritten, and overwrites the reconstructed samples of a collocated sub-block in the reconstructed block stored in the memory with the generated reconstructed samples of the current sub-block.

In some embodiments, the current block includes one or more non-overlapping partitions, including a current partition in which the current sub-block is located, and the reconstructed block includes one or more non-overlapping partitions that are collocated with the one or more partitions of the current block, respectively. In some embodiments, the processing circuitry determines the reconstructed samples of the reference sub-block stored in the memory are indicated as not overwritten, when the partition in the reconstructed block that includes the reference sub-block is collocated with one of the partitions in the current block that has not been reconstructed.

In some embodiments, the current block has a size of 128×128 luma samples, and the one or more partitions of the current block includes four partitions each having a size of 64×64 luma samples.

In some embodiments, the one or more partitions of the current block include only one partition that is a size of the current block. In some embodiments, each of the one or more partitions of the current block has a size that is equal to or greater than a maximum reference sub-block size used in the IBC.

In some embodiments, the current block includes upper-left, upper-right, lower-left, and lower-right partitions, and the reconstructed block includes upper-left, upper-right, lower-left, and lower-right partitions. In some embodiments, the processing circuitry determines the reconstructed samples of the reference sub-block stored in the memory are indicated as not overwritten when the current sub-block is located in the upper-left partition in the current block, and the reference sub-block is located in one of the upper-right, lower-left, and lower-right partitions in the reconstructed block. In some embodiments, the processing circuitry determines the reconstructed samples of the reference sub-block stored in the memory are indicated as not overwritten when the current sub-block is located in the one of the upper-left, upper-right, and lower-left partitions in the current block, and the reference sub-block is located in the lower-right partition in the reconstructed block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 10A is a schematic illustration of how reconstructed samples in a neighboring block are to be indicated as overwritten based on a position of a current sub-block that is coded using IBC in accordance with one embodiment.

DETAILED DESCRIPTION OF EMBODIMENTS

Figure 1:
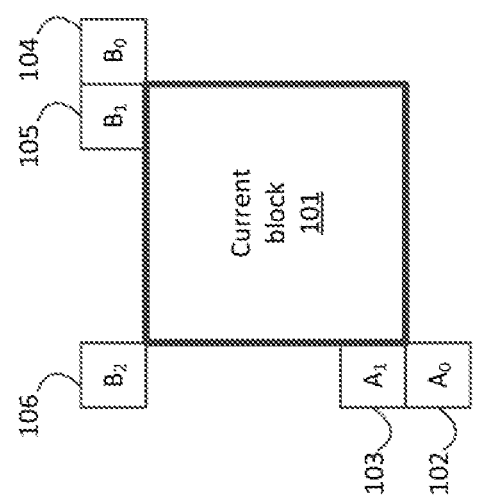
FIG. 1 is a schematic illustration of a current block and its surrounding spatial merge candidates in one example.
Figure 2:
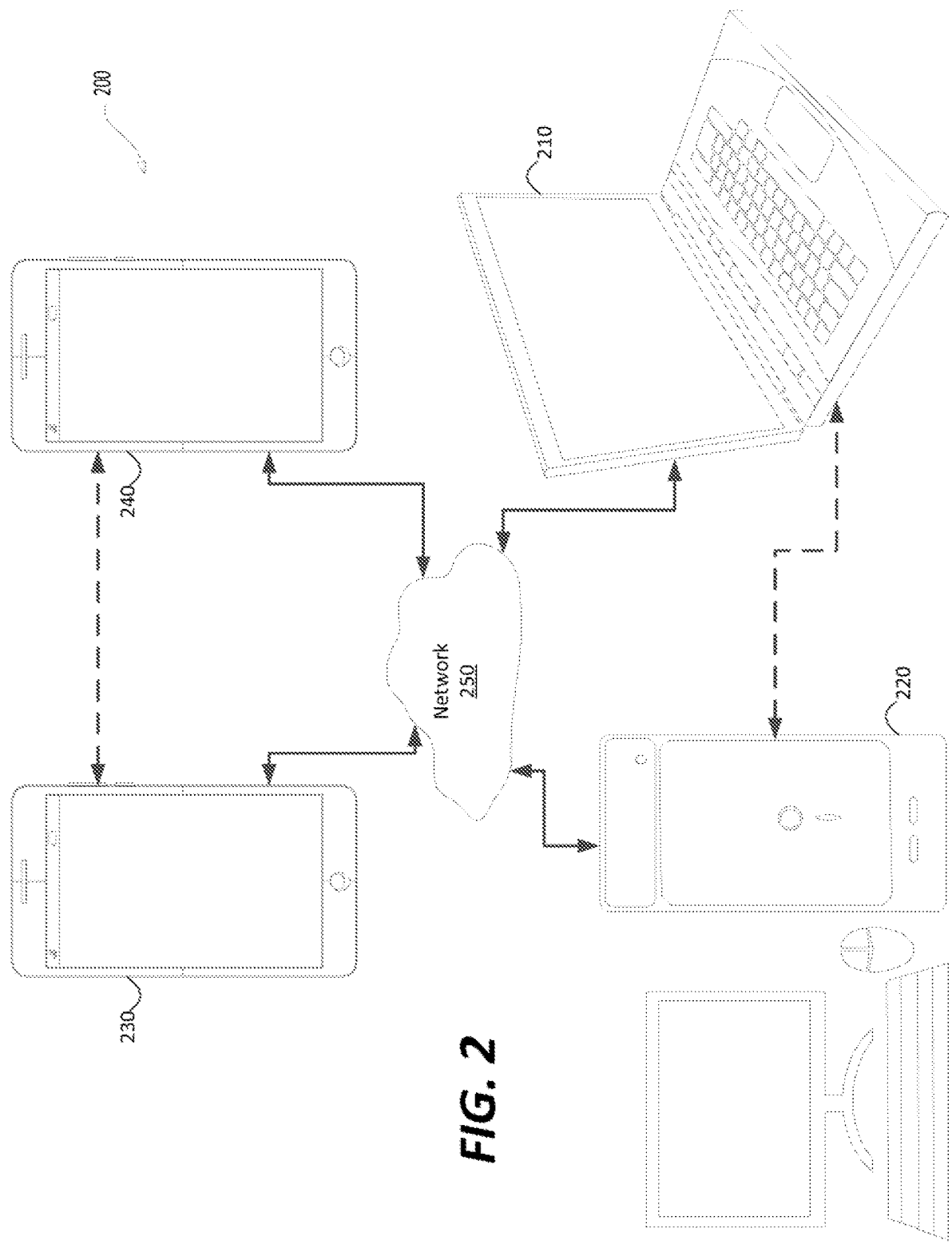
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
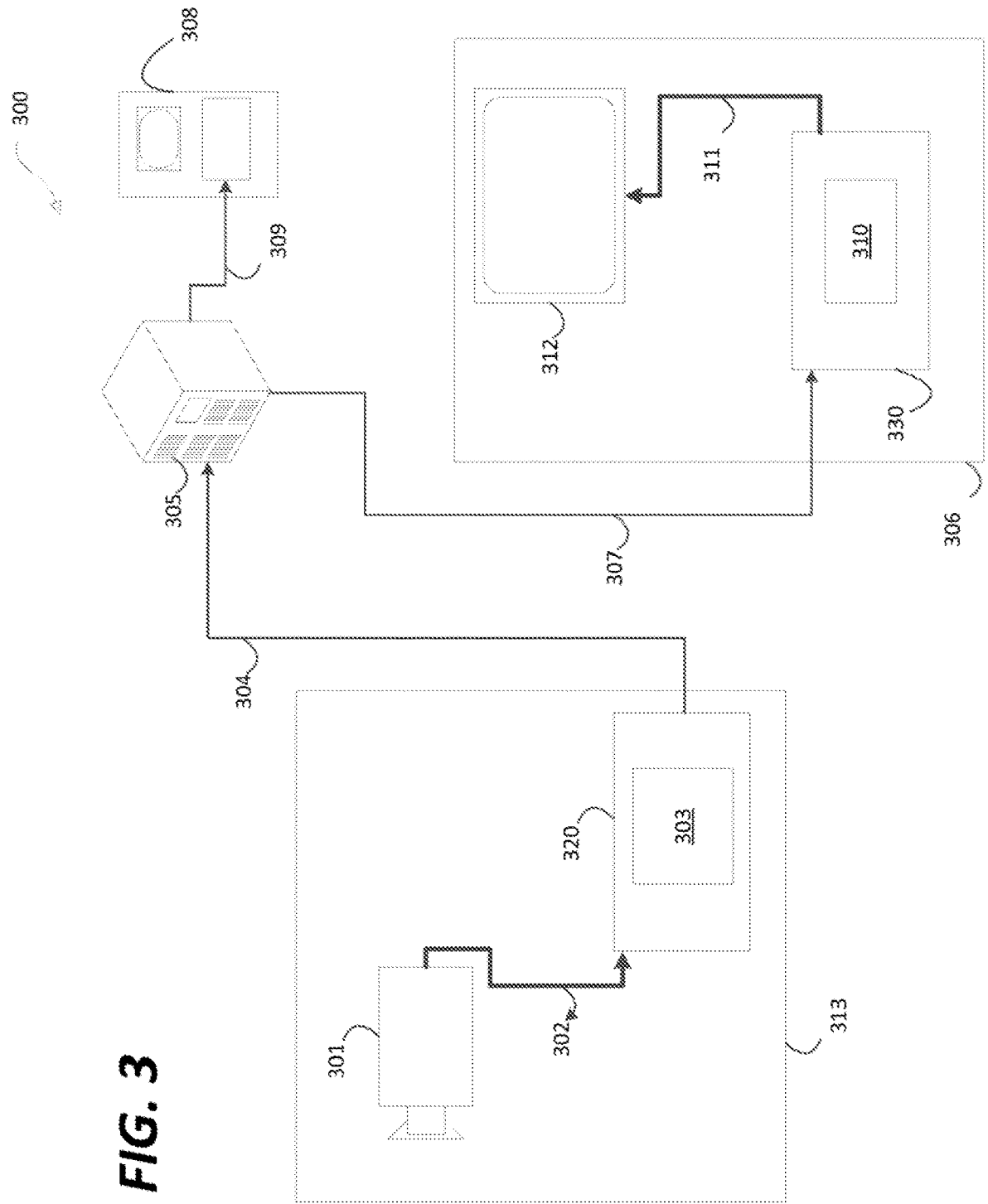
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
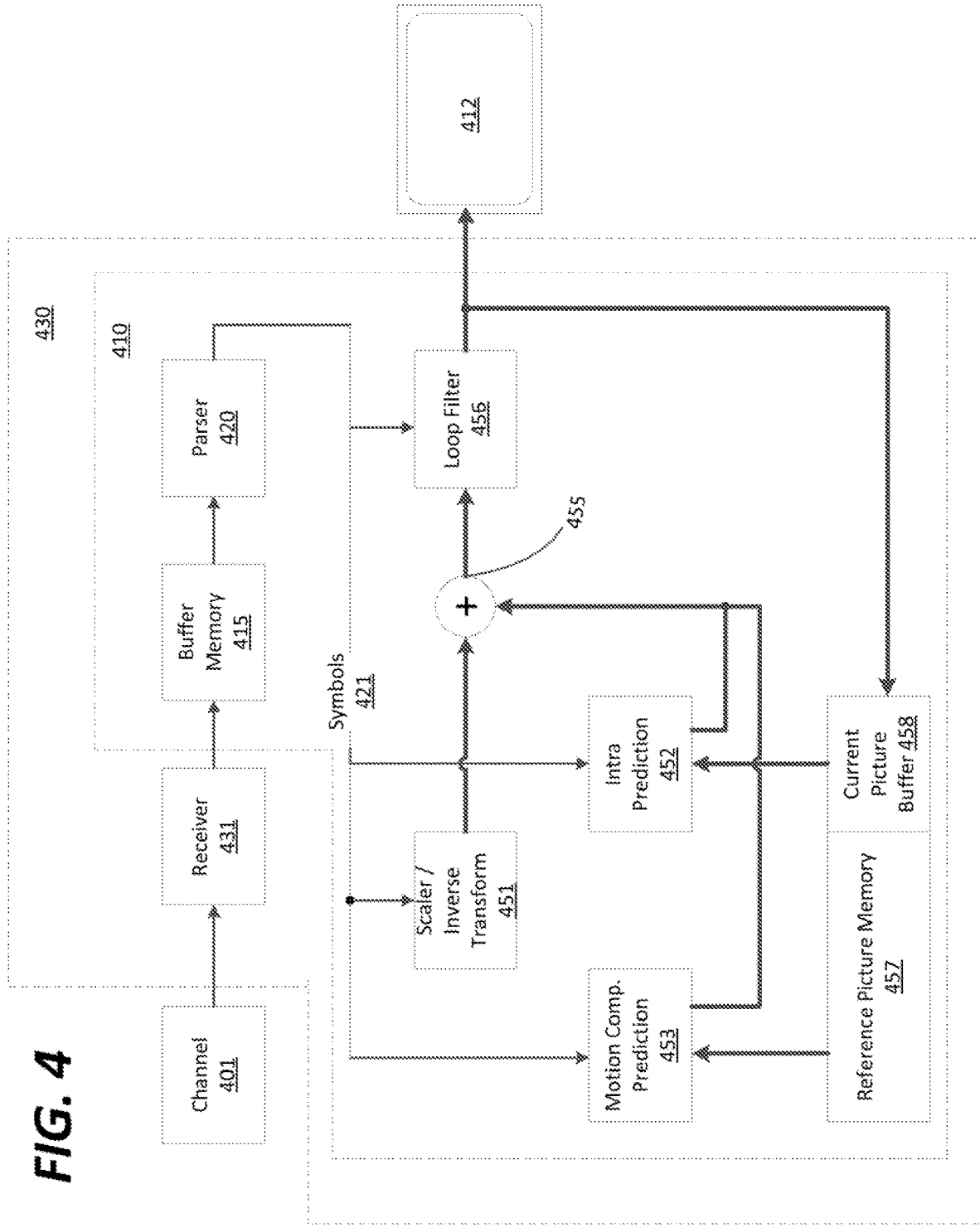
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
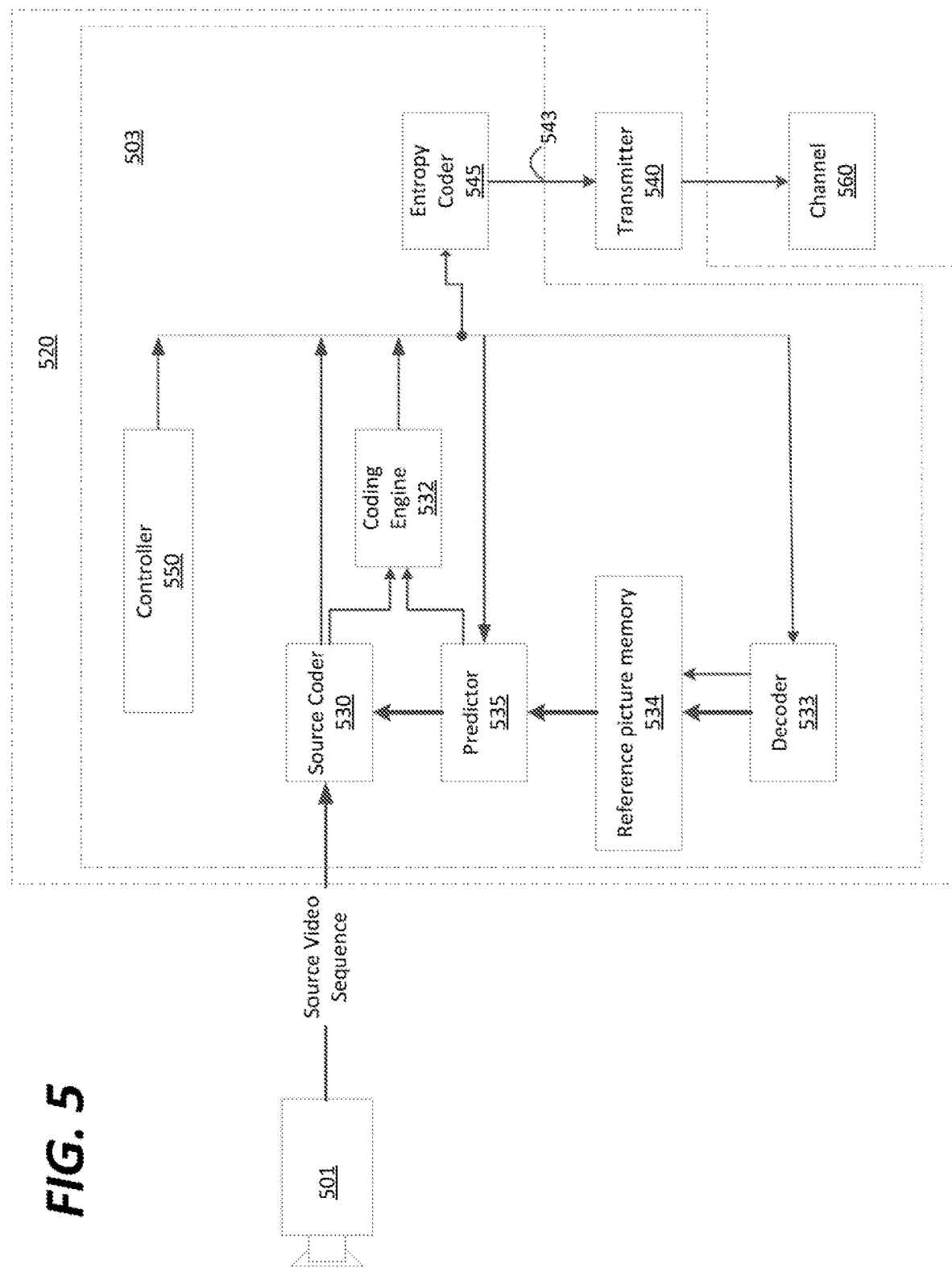
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503)

with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
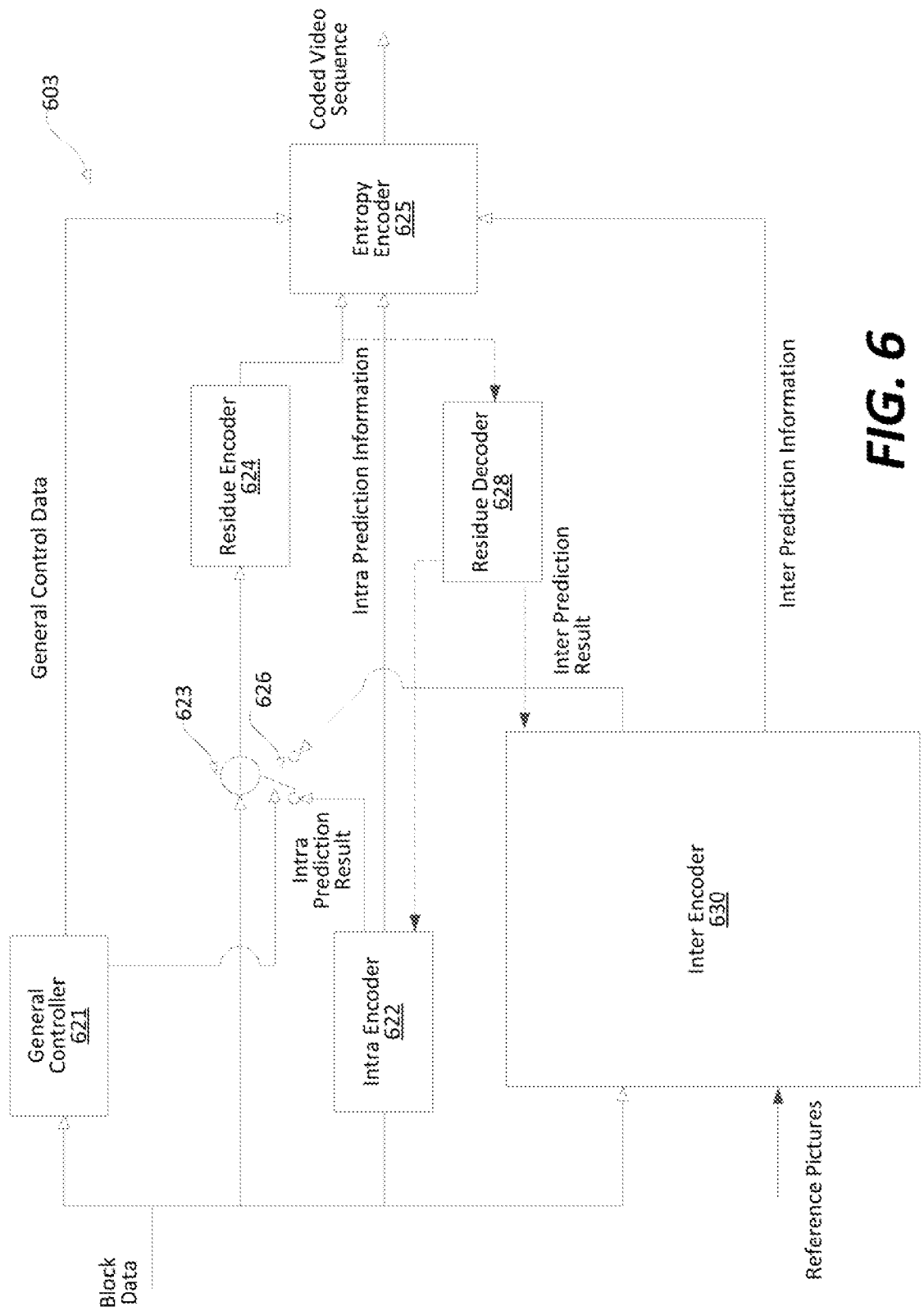
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
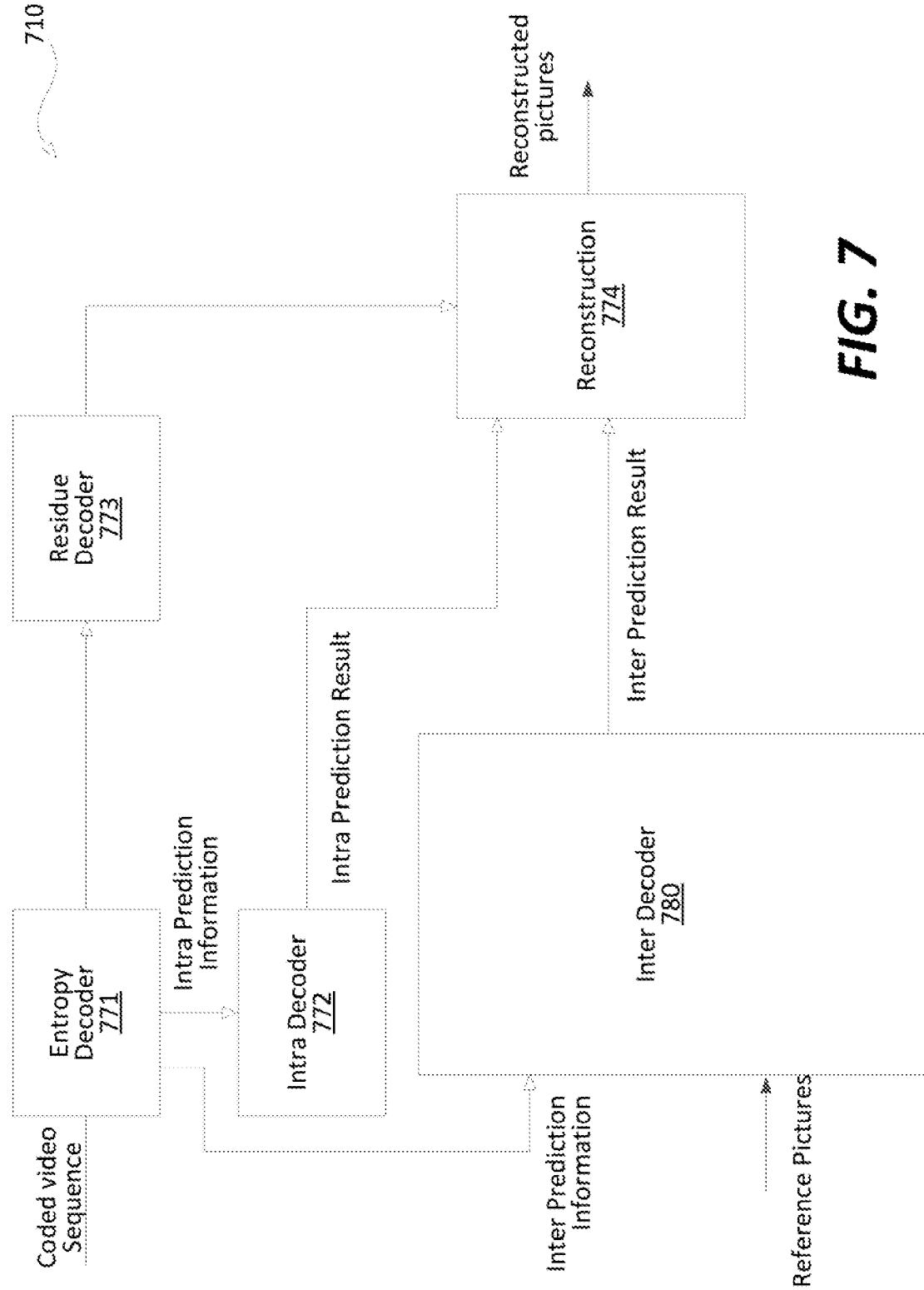
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Figure 8:
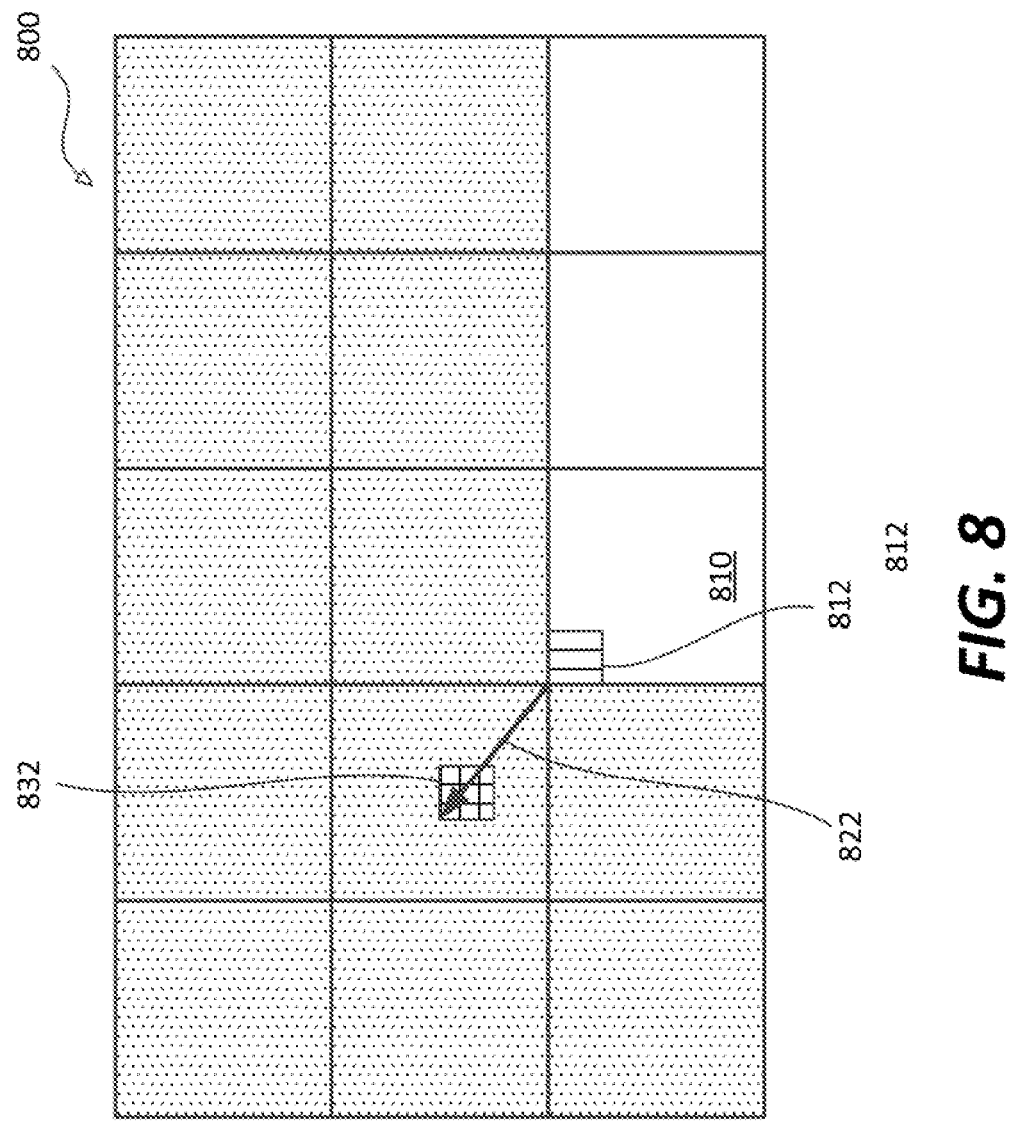
FIG. 8 is a schematic illustration of a current block in a current picture to be coded using intra block copy (IBC) in accordance with an embodiment.

FIG. 8 is a schematic illustration of a current block (810) in a current picture (800) to be coded using intra block copy (IBC) in accordance with an embodiment.

In some examples, a block may be coded using a reference block from a different picture, which is also referred to as motion compensation. In some examples, a block may be coded using a reference block from a previously reconstructed area within the same picture, which is also referred to as intra picture block compensation, current picture referencing (CPR), or intra block copy (IBC). A displacement vector that indicates the offset between the current block and the reference block is referred to as a block vector (or BV for short). Different from a motion vector in motion compensation, which can be at any value (positive or negative, at either x or y direction), a block vector is subject to constraints to ensure that the reference block has already been reconstructed and the reconstructed samples thereof are available. In some embodiments, in view of parallel processing constrains, a reference area that is beyond a tile boundary or wavefront ladder shape boundary is also excluded.

The coding of a block vector can be either explicit or implicit. In the explicit mode, the difference between a block vector and its predictor can be signaled in a manner similar to an AMVP mode in inter coding. In the implicit mode, the block vector can be recovered from a predictor, in a similar way as a motion vector in merge mode. The resolution of a block vector, in some implementations, is set to integer positions or, in some examples, to fractional positions.

The use of IBC at the block level can be signaled using a block level flag. In some examples, this flag can be signaled when the current block is not coded in merge mode. In some examples, this flag can be signaled by a reference index approach. This is done by treating the current decoded picture as a reference picture. In HEVC Screen Content Coding (HEVC SCC), such a reference picture is placed in the last position of the list. This special reference picture is also managed together with other temporal reference pictures in the Decoded Picture Buffer (DPB).

There are also some variations for implementing IBC, such as flipped intra block copy (where the reference block is flipped horizontally or vertically before being used to predict current block), or line based intra block copy (where each compensation unit inside an M×N coding block is an M×1 or 1×N line).

An example of using IBC is shown in FIG. 8, where the current picture (800) includes 15 blocks arranged into 3 rows and 5 columns. In some examples, each block corresponds to a Coding Tree Unit (CTU). The current block (810) includes a sub-block (812) (e.g., a coding block in the CTU) that has a block vector (822) pointing to a reference sub-block (832) in the current picture (800).

The reconstructed samples of the current picture can be stored in a dedicated memory. In consideration of implementation cost, the reference area where the reconstructed samples for reference blocks remain available may not be as large as an entire frame, depending on a memory size of the dedicated memory. Therefore, for a current sub-block using IBC, in some examples, an IBC reference sub-block may be limited to only certain neighboring areas, but not the entire picture.

In some embodiments, the dedicated memory to store reference samples of previously coded CUs for future intra block copy reference is referred to as a reference sample memory. In one example, the memory size is one CTU, such as for storing up to one previously coded CTU or one left CTU. In another example, the memory size is two CTUs, such as two previously coded CTUs or two left CTUs, or one current CTU together with one left CTU. In some embodiments, each CTU requires a memory size for storing 128×128 luma samples, together with corresponding chroma samples. When a reference block is outside the stored, reconstructed areas, the reference block cannot be used for IBC.

In some embodiments, when starting a new CTU (i.e., a current CTU), the reference sample memory allocates space for storing the reconstructed sample of the entire current CTU. In some examples, the memory size is one CTU, and the allocated space for the current CTU can still be partially used to store the reconstructed samples from a previously coded CTU, hence the allocation of space for the current CTU is not completed at the beginning of the current CTU. Therefore, a portion (or location) of the reference sample memory that stores the reconstructed samples from the previously coded CTU can be used in IBC mode to predict a current coding block in the current CTU until this portion is updated by the reconstructed samples of the current coding block in the current CTU. After that, the data in this portion can still be used for IBC reference for providing reconstructed samples from the current CTU, but no longer for providing the reconstructed samples from the previously coded CTU that have just been overwritten.

In some embodiments, the current CTU is divided into a number of partitions based on one or more predefined grid patterns. For example, into 64×64 partitions, into 32×32 partitions, etc. If the location of the current coding block in the current CTU falls into one of the predefined partitions, this will indicate the reconstructed samples for the whole corresponding partition stored in the reference sample memory will be updated with reconstructed samples from the current CTU, and the old reconstructed samples from a previously coded CTU in that partition in the reference sample memory cannot be used for IBC reference purposes. In some examples, the partition size is at least as large as a largest possible IBC code block size. For example, if the maximum reference block size for IBC is 64×64, then the CTU can be divided into as small as 64×64 partitions.

In some alternative embodiments, when a reference block in a previously coded CTU and its collocated block in the current CTU share the same location in the reference sample memory, the location of memory will be updated with the data from the current CTU when this collocated block in the current CTU is coded. During the coding process of the current CTU, for a coding block in IBC mode, its reference block in a previously coded CTU is found, whose reference samples are stored in the reference sample memory. For this reference block, if none of the samples in its collocated block in the current CTU has been coded, the location in reference sample memory has not been updated with the data from the current CTU, and this reference block, which contains reference samples from the previously coded CTU, can still be used for IBC. Otherwise, according to an embodiment, if at least one sample of the collocated block in the current CTU has been reconstructed, this reference block in the previously coded CTU can be indicated as overwritten and cannot be used for IBC reference.

In some embodiments, the memory size is two CTUs. When starting a new CTU (i.e., a current CTU), the reconstructed samples from a most recently coded CTU may be left as is, and the allocated space for the current CTU can be partially used to store the reconstructed samples from a previously coded CTU that is coded before the most recently coded CTU. Therefore, depending on the coding order, the block partitioning structure, and the availability of the reconstructed samples in the memory, the allowable area for reference samples used in IBC mode can be extended to the reconstructed part of the current CTU, the entire most recently coded CTU, and/or a portion of the previously coded CTU that can be indicated as not overwritten by the reconstructed samples of the current block.

In a different embodiment, the memory size is two CTUs. When starting a new CTU (i.e., a current CTU), the reconstructed samples from a most recently coded CTU may be left as is. Therefore, depending on the coding order, the block partitioning structure, and the availability of the reconstructed samples in the memory, the allowable area for reference samples used in IBC mode can be extended to the reconstructed part of the current CTU and the entire most recently coded CTU.

In some examples, the size of an IBC reference sub-block can be as large as a regular inter coded block. In order to utilize the reference sample memory more efficiently, the size of an IBC reference sub-block can be limited to not greater than 64 luma samples at either width or height edge, where corresponding size constraints apply to chroma samples, depending on the color format. For example, in 4:2:0 format, the size of a chroma block in IBC mode can be limited to not greater than 32 samples on each side. In some embodiments, lower limits, such as 32 luma samples each side can be used.

In the following non-limiting examples, for the purposes of illustrating various embodiments, the maximum IBC reference sub-block size is set to 64×64 luma samples. Therefore, in a CTU size of 128×128 luma samples, for luma samples, sub-blocks of 128×128, 128×64, 64×128, 128×32, 32×128, etc., cannot use intra block copy mode. For chroma samples, depending on the color format, similar to the constraints for luma samples, the corresponding sizes for chroma samples apply.

Figure 9:
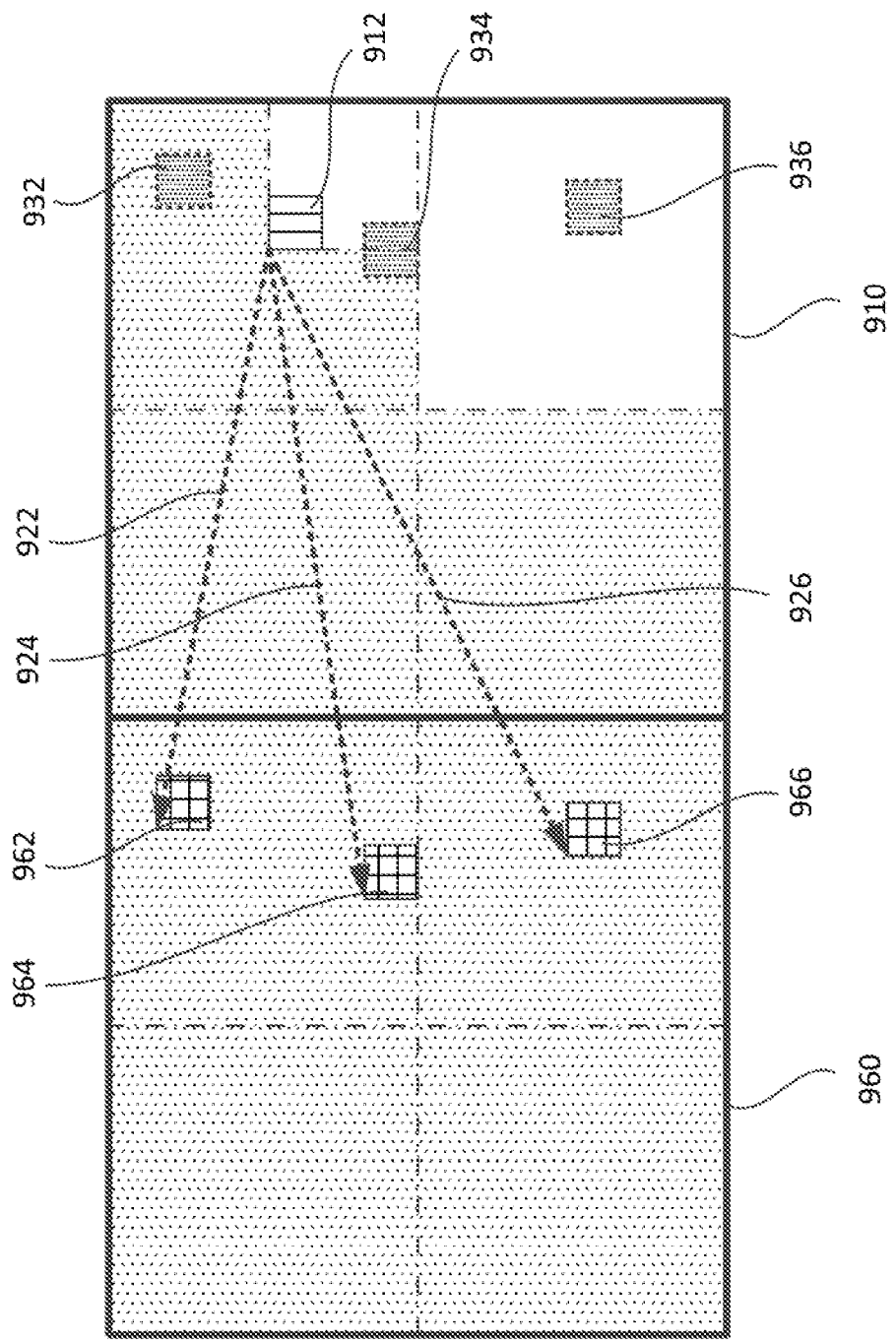
FIG. 9 is a schematic illustration of a current block and a neighboring block in a current picture using IBC in accordance with an embodiment.

FIG. 9 is a schematic illustration of a current block (CTU, 910) and a neighboring block (CTU, 960) in a current picture using IBC in accordance with an embodiment.

In some embodiments, two sub-blocks from different CTUs are referred to as collocated sub-blocks when these two sub-blocks have the same size and have a same location offset value relative to an upper-left corner of the respective CTU. FIG. 9 shows a current sub-block (912) in the current block (i.e., CTU) (910) and three of its possible reference sub-blocks (962, 964, and 966) in a left, previously coded block (960) that are identifiable by respective block vectors (922, 924, and 926). In this example, if the reference sample memory size is one CTU, reference sub-block (966) can be found from the memory because its collocated sub-block (936) in the current block (910) has not yet been reconstructed (white area). Therefore the location of the reference sample memory still stores the reference samples from the previously coded block (960). On the contrary, reference sub-block (962) cannot be used, as its collocated sub-block (932) in the current block (910) has been reconstructed completed (grey area). The location of reference sample memory for reference sub-block (962) has been overwritten with the reconstructed samples from the sub-block (932) in the current block (910). Similarly, reference sub-block (964) cannot be a valid reference sub-block, because part of its collocated sub-block (934) in the current block (910) has been reconstructed, and therefore that part of the memory has been partially overwritten with the data in the current block (910).

In order to efficiently utilize the stored reconstructed samples while sharing a memory space between CTUs, an encoder or a decoder can determine whether a reference sub-block from a previously coded block is overwritten (or is otherwise considered to be overwritten) based on a partition structure, a coding order, and/or a position of a current sub-block in a current block.

For example, when a reference sub-block in a previously coded block and its collocated sub-block in the current block share the same location in the reference sample memory, the location of memory can be indicated as updated (e.g., overwritten or otherwise considered as overwritten) with the data in the current block when any part of this collocated sub-block in the current block is coded. During the coding process of the current block, for a sub-block in IBC mode, its reference sub-block in a previously coded block is found, whose reference samples are stored in the reference sample memory. For this reference sub-block, if none of the samples in its collocated sub-block in the current block has been coded, the location in reference sample memory has not been updated with the data from the current block, this reference sub-block, which contains reference samples from a previously coded block, can be used for IBC reference. Otherwise, when at least one sample of the collocated sub-block in the current block is coded, the corresponding location in reference sample memory has been updated by the data in the current block, and this reference sub-block cannot be used for IBC reference.

The above general solution is based on checking availability of different locations during the process of encoding and/or decoding a current block. Such an availability checking process, in some examples, can be simplified to only checking availabilities at a few pre-set locations. In some examples, the determination of the availability of a 64×64 luma block from the previous coded block can be based on whether any part of its collocated 64×64 block of the current block has been coded or not. In this case, only the upper-left position of each 64×64 block in the current block may need to be checked. Other positions may be checked in other embodiments. The proposed methods/solutions can be extended to smaller block sizes, such as the evaluation based on 32×32 blocks.

Different determination factors for different partitioning structures will be further described based on the following two partitioning scenarios. Based on different partitioning structures, such availability determination may be made with no or limited checking of individual samples in order to improve IBC performance by increasing the available reference range without using extra reference sample memory.

Under a first scenario, each of the four 64×64 luma partitions (32×32 chroma partition in 4:2:0 format) in the current CTU will be contained completely in a coding block (also referred to as a sub-block); or, each coding block in the current CTU will be contained completely in one of the four 64×64 luma partitions (32×32 chroma partition in 4:2:0 format).

According to the first scenario, at a 128×128 CTU level, this block can be coded as is (128×128), or split into four 64×64 blocks and with a potential further split, or split into two 128×64 blocks and with a potential further split, or split into two 64×128 blocks and with a potential further split.

In some variations, ternary-tree split for a block with either edge (width or height) larger than 64 luma samples is not allowed; otherwise the resulting block will not be contained in one of the four 64×64 partitions, or contains one of the four 64×64 partitions completely.

In one example, if the coding block is 128×128 in size, and the max IBC block size is 64×64, then this 128×128 block will not be coded in IBC mode.

In one example, if the coding blocks are four 64×64 blocks, the availability of reference samples can be illustrated with reference to FIG. 10A.

Figure 10A:
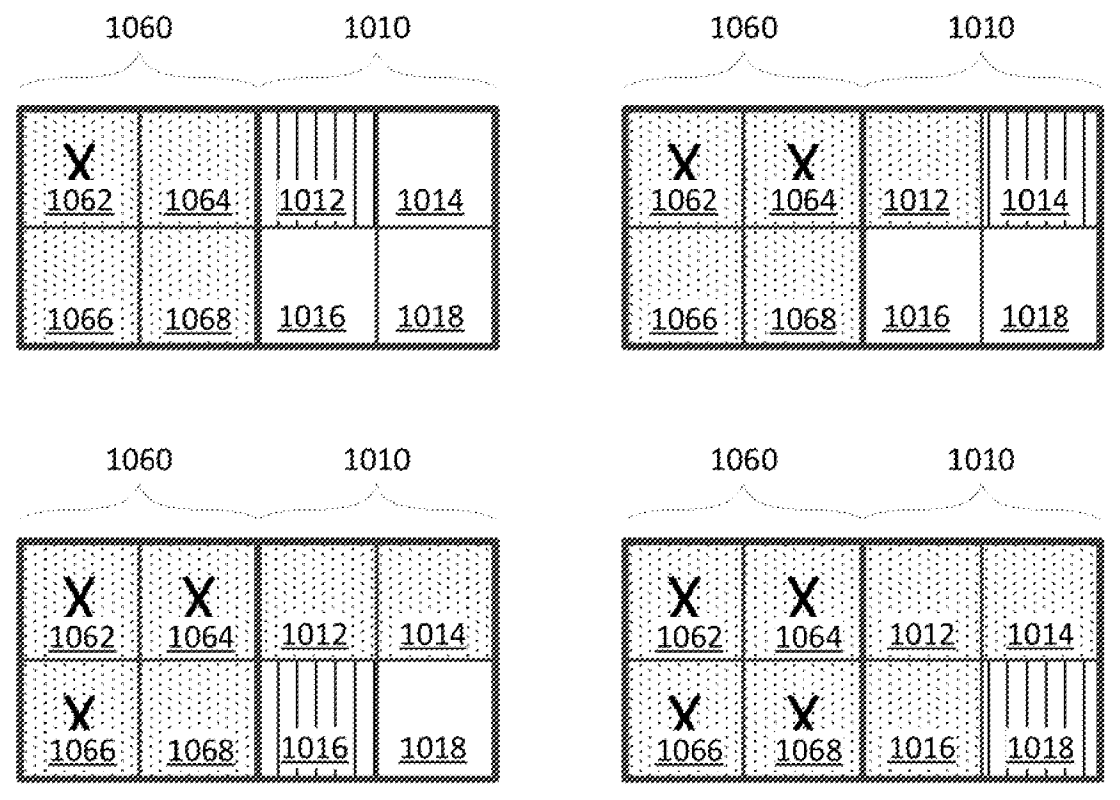

FIG. 10A is a schematic illustration of how reconstructed samples in a neighboring block are to be indicated as overwritten based on a position of a current sub-block that is coded using IBC in accordance with one embodiment.

In FIG. 10A, a current block (1010) corresponds to a current CTU that includes four 64×64 partitions (1012, 1014, 1016, and 1018). A previously coded block (1060) corresponds to a left CTU that includes four 64×64 partitions (1062, 1064, 1066, and 1068). The coding order for processing coding blocks in the current block (1010) starts from the upper-left partition (1012), then the upper-right partition (1014), then the lower-left partition (1016), and finally the lower-right partition (1018). The 64×64 partition with vertical stripes is where the current coding block is located (the current coding block can be smaller than 64×64 in size). The shaded grey blocks are the reconstructed blocks. The ones marked "X" are not available for IBC reference since they should be or have been overwritten with the reconstructed samples from the current block in the corresponding locations.

Therefore, if the current coding block falls into the upper-left 64×64 partition (1012) of the current block (1010), then in addition to the already reconstructed samples in the current CTU, the reconstructed samples in the upper-right, lower-left, and lower-right 64×64 partitions (1064, 1066, and 1068) of the left CTU (block 1060), can be referenced using the IBC mode. Partition (1062) is indicated as overwritten and thus unavailable.

If the current block falls into the upper-right 64×64 partition (1014) of the current block (1010), then in addition to the already reconstructed samples in the current CTU, the reconstructed samples in the lower-left and lower-right 64×64 partitions (1066 and 1068) of the left CTU (block 1060), can be referenced using the IBC mode in an embodiment. Partitions (1062 and 1064) are indicated as overwritten and thus unavailable.

If the current block falls into the lower-left 64×64 partition (1016) of the current block (1010), then in addition to the already reconstructed samples in the current CTU, the reference samples in the lower-right 64×64 partition of the left CTU (block 1060), can be referenced using the IBC mode in an embodiment. Partitions (1062, 1064, and 1066) are indicated as overwritten and thus unavailable.

If the current block falls into the lower-right 64×64 partition (1018) of the current block (1010), only the already reconstructed samples in the current CTU can be referenced using the IBC mode in an embodiment. Partitions (1062, 1064, 1066, and 1068) are indicated as overwritten and thus unavailable.

The above assumption works for the case that the CTU will be split in quad-tree at a first level (if there is any split at 128×128 level), such as when a separate luma/chroma coding tree (dual-tree) is used.

In one example, if the coding blocks are two 128×64 blocks, it is not allowed to apply horizontal binary-tree split at the next level. Otherwise, the resulting 128×32 block will be contained by two 64×64 partitions, which violates the assumption under the first scenario. Therefore, each 128×64 block will be coded as is, or split into two 64×64 blocks, or may be split by quad-tree into four 64×16 blocks.

In one example, if the coding blocks are two 64×128 blocks, it is not allowed to apply vertical binary-tree split at the next level. Otherwise, the resulting 32×128 block will be contained by two 64×64 partitions, which violates the assumption under the first scenario. Therefore, each 64×128 block will be coded as is, or split into two 64×64 blocks, or may be split by quad-tree into four 16×64 blocks.

In some examples, the VVC standard allows flexible block partitioning strategies with quad-tree, binary-tree, and ternary-tree. If the first level split is not quad-tree, it can still be binary-tree split (not ternary split), such as when dual-tree is not used. If vertical binary-tree split is applied at the first level from the CTU, such as having two 128×64 blocks or two 64×128 blocks, then the coding order of 2nd and 3rd of the four 64×64 partitions in FIG. 10A may be different.

Figure 10B:
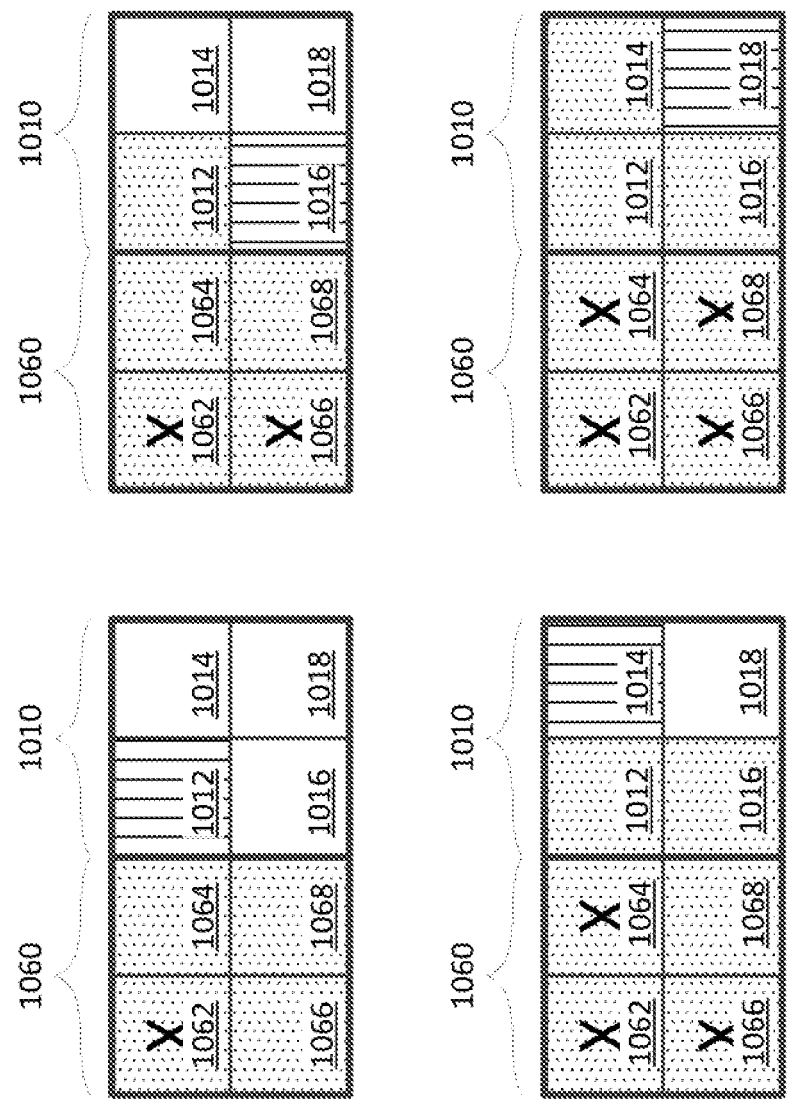
FIG. 10B is a schematic illustration of how reconstructed samples in a neighboring block are to be indicated as overwritten based on a position of a current sub-block that is coded using IBC in accordance with another embodiment.

FIG. 10B is a schematic illustration of how reconstructed samples in a neighboring block are to be indicated as overwritten based on a position of a current sub-block that is coded using IBC in accordance with another embodiment. In FIG. 10B, the availability of reference samples for an upper-right 64×64 partition and a lower-left 64×64 partition are shown, when the vertical binary-tree split is applied at a 128×128 level from the CTU. When the horizontal binary-tree split is applied at a 128×128 level from the CTU, the coding order and availability of reference samples for an upper-right 64×64 block and a lower-left 64×64 block are the same as in FIG. 10A.

Therefore, if a current coding block falls into the upper-left 64×64 partition (1012) of the current block (1010), then in addition to the already reconstructed samples in the current CTU, the reconstructed samples in the upper-right, lower-left, and lower-right 64×64 partitions (1064, 1066, and 1068) of the left CTU (block 1060), can be referenced using the IBC mode according to an embodiment. Partition (1062) is indicated as overwritten and thus unavailable.

If the current block falls into the lower-left 64×64 partition (1016) of the current block (1010), then in addition to the already reconstructed samples in the current CTU, the reconstructed samples in the upper-right and lower-right 64×64 partitions (1064 and 1068) of the left CTU (block 1060), can be referenced using the IBC mode according to an embodiment. Partitions (1062 and 1066) are indicated as overwritten and thus unavailable.

If the current block falls into the upper-right 64×64 partition (1016) of the current block (1010), then in addition to the already reconstructed samples in the current CTU, the reference samples in the lower-right 64×64 partition of the left CTU (block 1060), can be referenced using the IBC mode. Partitions (1062, 1064, and 1066) are indicated as overwritten and thus unavailable.

If the current block falls into the lower-right 64×64 partition (1018) of the current block (1010), only the already reconstructed samples in the current CTU can be referenced using the IBC mode according to an embodiment. Partitions (1062, 1064, 1066, and 1068) are indicated as overwritten and thus unavailable.

For the discussions with reference to FIG. 10A and FIG. 10B, two exemplary solutions are summarized as follows.

A first exemplary solution is for fully reusing the reference sample memory when possible. More specifically, depending on the location of a current sub-block (e.g., a coding block) relative to a current block (e.g., a CTU), the following can apply:

If a current sub-block falls into the upper-left 64×64 partition of the current block, then in addition to the already reconstructed samples in the current block, it can also refer to the reconstructed samples in the upper-right, lower-left, and lower-right 64×64 partitions of the left block, using the IBC mode.

If the current sub-block falls into the upper-right 64×64 partition of the current block, then in addition to the already reconstructed samples in the current block, it can also refer to the reconstructed samples in the lower-right 64×64 partition of the left block, using the IBC mode. Also, if luma location (0, 64) relative to the current block has not yet been reconstructed, the current sub-block can also refer to the reconstructed samples in the lower-left 64×64 partition of the left block, using the IBC mode.

If the current sub-block falls into the lower-left 64×64 partition of the current block, then in addition to the already reconstructed samples in the current block, it can also refer to the reconstructed samples in the lower-right 64×64 partition of the left block, using the IBC mode. If luma location (64, 0) relative to the current block has not yet been reconstructed, the current sub-block can also refer to the reconstructed samples in the upper-right 64×64 partition of the left block, using the IBC mode.

If the current block falls into the lower-right 64×64 partition of the current block, it can only refer to the already reconstructed samples in the current block, using IBC mode.

Table I below summarizes the availabilities of reconstructed samples from a left block for a first exemplary solution. UL, UR, LL, and LR refer to upper-left, upper-right, lower-left, and lower-right, respectively. Mark "X" means not available, mark "Y" means available.

TABLE I reconstructed sample availability for first exemplary solution

| | Ref sample in left block | | | |
|---|---|---|---|---|
| Current sample in current block | UL 64 × 64 | UR 64 × 64 | LL 64 × 64 | LR 64 × 64 |
| UL 64 × 64 | X | Y | Y | Y |
| UR 64 × 64 | X | X | Y (when (0, 64) location is not reconstructed)/ X | Y |
| LL 64 × 64 | X | Y (when (64, 0) location is not reconstructed)/ X | X | Y |
| LR 64 × 64 | X | X | X | X |

A second exemplary solution is for a simplified process regardless of the adopted block partitioning strategy. More specifically, depending on the location of a current sub-block (e.g., a coding block) relative to a current block (e.g., a CTU), the following can apply:

If a current sub-block falls into the upper-left 64×64 partition of the current block, then in addition to the already reconstructed samples in the current block, it can also refer to the reconstructed samples in the upper-right, lower-left, and lower-right 64×64 partitions of the left block, using the IBC mode.

If the current sub-block falls into the upper-right 64×64 partition of the current block, then in addition to the already reconstructed samples in the current block, it can also refer to the reconstructed samples in the lower-right 64×64 partition of the left block, using the IBC mode.

If the current sub-block falls into the lower-left 64×64 partition of the current block, then in addition to the already reconstructed samples in the current block, it can also refer to the reconstructed samples in the lower-right 64×64 partition of the left block, using the IBC mode.

If the current block falls into the lower-right 64×64 partition of the current block, it can only refer to the already reconstructed samples in the current block, using the IBC mode.

Table II below summarizes the availabilities of reconstructed samples from a left block for a second exemplary solution. UL, UR, LL, and LR refer to upper-left, upper-right, lower-left, and lower-right, respectively. Mark "X" means not available, mark "Y" means available.

TABLE II reconstructed sample availability for second exemplary solution

| | Ref sample in left block | | | |
|---|---|---|---|---|
| Current sample in current block | UL 64 × 64 | UR 64 × 64 | LL 64 × 64 | LR 64 × 64 |
| UL 64 × 64 | X | Y | Y | Y |
| UR 64 × 64 | X | X | X | Y |
| LL 64 × 64 | X | X | X | Y |
| LR 64 × 64 | X | X | X | X |

Under a second scenario, at CTU root (128×128 luma samples), only a quad-tree and a binary-tree split is allowed. After that, a binary split or a ternary split can be applied to either side of each 64×128, 128×64, or 64×64 block.

According to the second scenario, it is only guaranteed that if the current sub-block in CPR mode falls into the upper-left 64×64 partition, then all the coding units in the upper-left 64×64 partition will be coded prior to coding blocks in the lower-right 64×64 partition. In this case, the lower-right 64×64 partition of left block has not yet been updated while processing coding units in the upper-left 64×64 partition of current block. Reconstructed samples in this reference area (the lower-right 64×64 partition of left block) can be used for CPR referencing.

For coding blocks in the other three 64×64 partitions of the current block, there is no guarantee that a complete 64×64 partition that contains reference samples of the left block will not be updated during the processing of coding units in the corresponding 64×64 partitions. In some examples, no special operation is proposed.

Under the second scenario, two exemplary solutions are summarized as follows.

A third exemplary solution allows the lower-right 64×64 partition of left block to be used as reference for CPR mode, if current sub-block is inside the upper-left 64×64 partition of the current block. For sub-blocks inside other three 64×64 partitions of the current block, they can only refer to reconstructed samples within the current block.

Table III below summarizes the availabilities of reconstructed samples from a left block for a third exemplary solution. UL, UR, LL, and LR refer to upper-left, upper-right, lower-left, and lower-right, respectively. Mark "X" means not available, mark "Y" means available.

TABLE III reconstructed sample availability for third exemplary solution

| Current sample in current block | Ref sample in left block | | | |
|---|---|---|---|---|
| | UL 64 × 64 | UR 64 × 64 | LL 64 × 64 | LR 64 × 64 |
| UL 64 × 64 | X | X | X | Y |
| UR 64 × 64 | X | X | X | X |
| LL 64 × 64 | X | X | X | X |
| LR 64 × 64 | X | X | X | X |

To further improve upon the third exemplary solution, for each sub-block in the current block, the availability of each 64×64 partition in left block can be evaluated by checking the top-left corner's availability of each 64×64 partition in the current block. For example, when a current sub-block is in an upper-right 64×64 partition of the current block, if the upper-left corner of the lower-left 64×64 partition in the current block has not yet been reconstructed, that means the upper-left and upper-right 64×64 partitions of current block will be processed prior to the lower-left and lower-right 64×64 partitions of current block. So the reference sample memory locations that store reference samples in the lower-left and lower-right 64×64 partition of the left block have not yet been updated. They can be used as references for the current sub-block in CPR mode. Similar checks for upper-left corner of upper-right 64×64 partition will apply.

Accordingly, the fourth exemplary solution allows for more fully reusing the reference sample memory when possible. More specifically, depending on the location of the current sub-block relative to the current block, the following can apply:

If a current sub-block falls into the upper-left 64×64 partition of the current block, then in addition to the already reconstructed samples in the current block, it can also refer to the reconstructed samples in the lower-right 64×64 partition of the left block, using the IBC mode. Also, if luma location (0, 64) relative to the current block has not yet been reconstructed, the current sub-block can also refer to the reconstructed samples in the lower-left 64×64 partition of the left block, using the IBC mode. If luma location (64, 0) relative to the current block has not yet been reconstructed, the current sub-block can also refer to the reconstructed samples in the upper-right 64×64 partition of the left block, using the IBC mode.

If the current sub-block falls into the upper-right 64×64 partition of the current block, then in addition to the already reconstructed samples in the current block, if luma location (0, 64) relative to the current block has not yet been reconstructed, the current sub-block can also refer to the reconstructed samples in the lower-left 64×64 partition and the lower-right 64×64 partition of the left block, using the IBC mode.

If the current sub-block falls into the lower-left 64×64 partition of the current block, then in addition to the already reconstructed samples in the current block, if luma location (64, 0) relative to the current block has not yet been reconstructed, the current sub-block can also refer to the reconstructed samples in the upper-left 64×64 partition and the lower-right 64×64 partition of the left block, using the IBC mode.

If the current block falls into the lower-right 64×64 partition of the current block, it can only refer to the already reconstructed samples in the current block, using the IBC mode.

Table IV below summarizes the availabilities of reconstructed samples from left block for a fourth exemplary solution. UL, UR, LL, and LR refer to upper-left, upper-right, lower-left, and lower-right, respectively. Mark "X" means not available, mark "Y" means available.

TABLE IV reconstructed sample availability for fourth exemplary solution

| Current sample in current block | Ref sample in left block | | | |
|---|---|---|---|---|
| | UL 64 × 64 | UR 64 × 64 | LL 64 × 64 | LR 64 × 64 |
| UL 64 × 64 | X | Y (when (64, 0) location is not reconstructed)/ X | Y (when (0, 64) location is not reconstructed)/ X | Y |
| UR 64 × 64 | X | X | Y (when (0, 64) location is not reconstructed)/ X | Y (when (0, 64) location is not reconstructed)/ X |
| LL 64 × 64 | X | Y (when (64, 0) location is not reconstructed)/ X | X | Y (when (64, 0) location is not reconstructed)/ X |
| LR 64 × 64 | X | X | X | X |

In the above discussed solutions, the reconstructed samples in the left block are divided into four 64×64 partitions. Each one of the 64×64 partitions is considered as a whole unit to determine if reconstructed samples in this partition can be used in coding a current sub-block in CPR mode. The proposed solutions as discussed above can also be applicable to finer partitioning settings, such as, to evaluate each 32×32 partition in the reference sample memory.

Furthermore, the evaluation of whether a reference sub-block for the current sub-block in IBC mode is in the left block can be done by determining whether (a) all the samples in the reference sub-block are from the left block; or (b) any reconstructed sample in the reference sub-block is from the left block.

An example of the block vector constraints based on the fourth solution discussed above is used as a non-limiting example illustrated as follows. Also, in the example illustrated below, a CTU has a size of 128×128 and the reference sample memory has a size of storing one CTU. In the following example, there is no chroma interpolation for IBC mode.

In this non-limiting example, assume the following:
a luma location (xCb, yCb) of the upper-left sample of the current luma coding block (e.g., current sub-block) relative to the upper-left luma sample of the current picture,
a variable cbWidth specifying the width of the current coding block in luma samples,
a variable cbHeight specifying the height of the current coding block in luma samples, a variable ctuSize specifying the size (with or height) of coding tree block (e.g., current block) in luma samples, and a luma block vector (bVx, bVy) for the current luma coding block in integer accuracy.

Therefore, the upper left location of the current sub-block is (xCb, yCb), the lower right location of the current sub-block is (xCb+cbWidth−1, yCb+cbHeight−1). Also, the upper left location of the reference sub-block is (xCb+bVx, yCb+bVy), and the lower right location of the reference sub-block is (xCb+bVx+cbWidth−1, yCb+bVy+cbHeight−1).

In this non-limiting example, a valid block vector satisfies the following conditions:

the entire reference sub-block is reconstructed prior to the current sub-block, the entire reference sub-block is in the same tile/slice as the current sub-block, bVx+cbWidth+xCb<=0 or bVy+cbHeight+yCb<=0, (yCb+bVy)/ctuSize=yCb/ctuSize, (yCb+bVy+cbHeight−1)/ctuSize=yCb/ctuSize, (xCb+bVx)/ctuSize>=(xCb/ctuSize)−1, and (xCb+bVx+cbWidth−1)/ctuSize<=xCb/ctuSize.

If (xCb+bVx)/ctuSize equals (xCb/ctuSize)−1, which means at least part of the reference sub-block is in the left block, the followings apply:

the condition (xCb % ctuSize>=64 && yCb % ctuSize>=64) is not true, if xCb % ctuSize<64 && yCb % ctuSize<64, if location ((xCb/ctuSize)+64, (yCb/ctuSize)) is not available (it means the sample in this location has not been reconstructed), and location ((xCb/ctuSize), (yCb/ctuSize)+64) is not available, then either (xCb+bVx) % ctuSize>64 or (yCb+bVy) % ctuSize>64 is true, else if location ((xCb/ctuSize)+64, (yCb/ctuSize)) is not available, then (xCb+bVx) % ctuSize>64 is true, and else (this means location ((xCb/ctuSize), (yCb/ctuSize)+64) is not available), (yCb+bVy) % ctuSize>64 is true, if xCb % ctuSize>=64 && xCb % ctuSize<64, the location ((xCb/ctuSize), (yCb/ctuSize)+64) is not available, and (yCb+bVy) % ctuSize>64 is true, and if xCb % ctuSize<64 && xCb % ctuSize>=64, the location ((xCb/ctuSize)+64, (yCb/ctuSize)) is not available, and (xCb+bVx) % ctuSize>64 is true.

The proposed solutions as described above can be extended also to other configurations of the reference sample memory. Further, while the determination of which reconstructed samples are available is described above with respect to certain processing orders and partition size (e.g., left to right, or top to bottom), it is noted that the determination can be modified in accordance with other processing orders and/or partition sizes in other embodiments.

Figure 11:
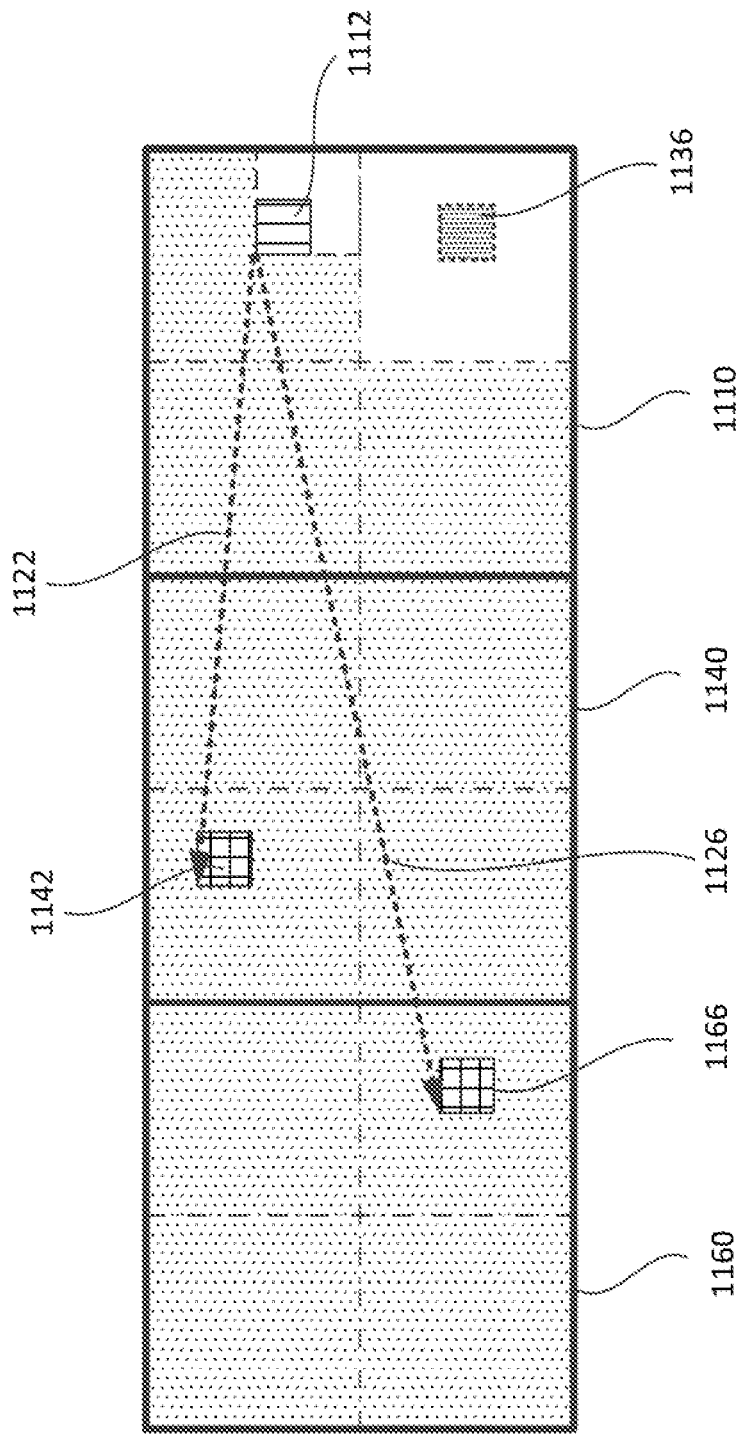
FIG. 11 is a schematic illustration of a current block, a first reference block, and a second reference block between the current block and the first reference block in a current picture using IBC in accordance with an embodiment.

FIG. 11 is a schematic illustration of a current block (CTU, 1110), a first reference block (CTU, 1160), and a second reference block (CTU, 1140) between the current block (CTU, 1110) and the first reference block (CTU, 1160) in a current picture using IBC in accordance with an embodiment. FIG. 11 shows a current sub-block (1112) in the current block (i.e., CTU) (1110), a first possible reference sub-block (1166) in the first reference block (1160) that is identifiable by a block vector (1126), and a second possible reference sub-block (1142) in the second reference block (1140) that is identifiable by a block vector (1122). Because the memory space for storing the reconstructed samples of block (1140) remains intact when generating the reconstructed samples of the current block (1110), all reconstructed samples of the second reference block (1140) can be available for determining a reference sub-block for the current sub-block (1112) in the IBC mode. However, the memory space for storing the reconstructed samples of the first reference block (1160) is allocated for storing the reconstructed samples of the current block (1110), the availability of the reference sub-block within the first reference block (1160) would depend on whether the collocated block in the current block (1110) has been reconstructed, in a manner similar to those discussed above with reference to FIGS. 9-11.

Figure 12:
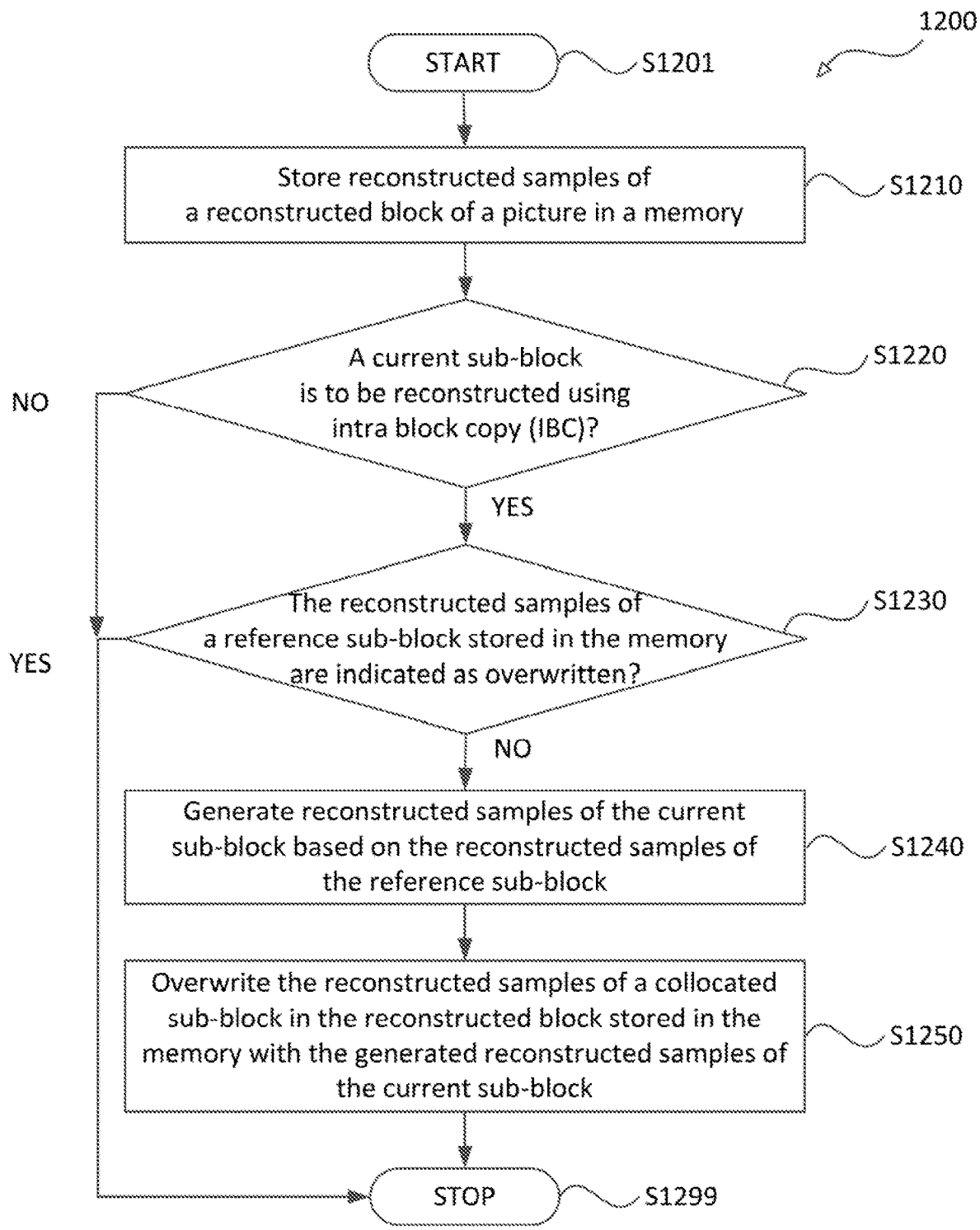
FIG. 12 shows a flow chart outlining a decoding process (1300) according to an embodiment of the disclosure.

FIG. 12 shows a flow chart outlining a decoding process (1200) according to an embodiment of the disclosure. The process (1200) can be used in the reconstruction of a block (i.e., a current block) of a picture coded using IBC mode. In some embodiments, one or more operations are performed before or after process (1200), and some of the operations illustrated in FIG. 12 may be reordered or omitted.

In various embodiments, the process (1200) is executed by processing circuitry, such as the processing circuitry in the terminal devices (210), (220), (230), and (240), the processing circuitry that performs functions of the video decoder (310), (410), or (710), and the like. In some embodiments, the process (1200) is implemented by software instructions, thus when the processing circuitry executes the software instructions, the processing circuitry performs the process (1200). The process starts at (S1201) and proceeds to (S1210).

At (S1210), reconstructed samples of a reconstructed block of a picture are stored in a memory. The reconstructed samples of the reconstructed block are reconstructed according to an encoded video bitstream. In some examples, the reconstructed block corresponds to the block (960) in FIG. 9 or block (1160) in FIG. 11. In some examples, the reconstructed samples of the reconstructed block can be generated using the system or decoders illustrated in FIGS. 3, 4, and 7.

At (S1220), whether a current sub-block in a current block of the picture is to be reconstructed using intra block copy (IBC) based on a reference sub-block in the reconstructed block is determined. If it is determined that the current sub-block is to be reconstructed using IBC, the process proceeds to (S1230). Otherwise, the current sub-block can be reconstructed using another process, and the process proceeds to (S1299) and terminates for the purposes of coding using IBC mode.

At (S1230), whether the reconstructed samples of the reference sub-block stored in the memory are overwritten (or otherwise indicated as overwritten) is determined based on a position of the current sub-block. In some examples, the reconstructed samples of the reference sub-block stored in the memory are determined as overwritten as described above, for example with reference to FIGS. 9-11. When it is determined that the reconstructed samples of the reference sub-block stored in the memory are indicated as not overwritten, the process proceeds to (S1240). Otherwise, the current sub-block is to be reconstructed without using the reconstructed samples of the reference sub-block or by another process, and the process proceeds to (S1299) and terminates for the purposes of coding using IBC mode. In some examples, the reconstructed samples of the reconstructed block can be generated using the system or decoders illustrated in FIGS. 3, 4, and 7.

At (S1240), the reconstructed samples of the current sub-block are generated for output based on the reconstructed samples of the reference sub-block when the reconstructed samples of the reference sub-block stored in the memory are determined to be indicated as not overwritten. At (S1250), the reconstructed samples of a collocated sub-block in the reconstructed block stored in the memory are overwritten with the generated reconstructed samples of the current sub-block. In some examples, the reconstructed samples of the reconstructed block can be generated using the system or decoders illustrated in FIGS. 3, 4, and 7.

After (S1250), the process proceeds to (S1299) and terminates.

Figure 13:
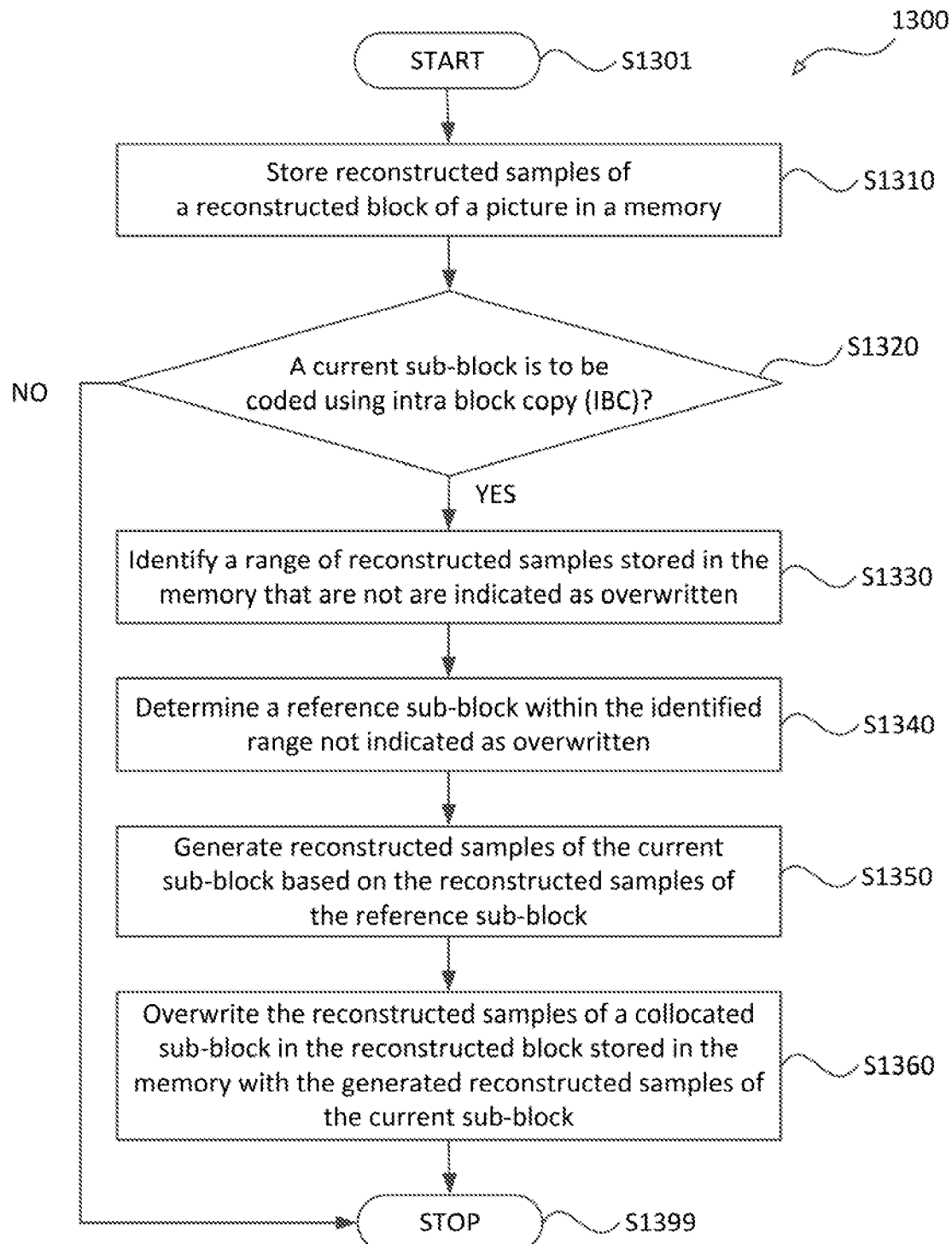
FIG. 13 shows a flow chart outlining an encoding process (1400) according to an embodiment of the disclosure.

FIG. 13 shows a flow chart outlining an encoding process (1300) according to an embodiment of the disclosure. The process (1300) can be used to encode a block (i.e., a current block) of a picture using IBC mode. In some embodiments, one or more operations are performed before or after process (1300), and some of the operations illustrated in FIG. 13 may be reordered or omitted.

In various embodiments, the process (1300) is executed by processing circuitry, such as the processing circuitry in the terminal devices (210), (220), (230), and (240), the processing circuitry that performs functions of the video encoder (303), (503), or (603), and the like. In some embodiments, the process (1300) is implemented by software instructions, thus when the processing circuitry executes the software instructions, the processing circuitry performs the process (1300). The process starts at (S1301) and proceeds to (S1310).

At (S1310), reconstructed samples of a reconstructed block of a picture are stored in a memory. The reconstructed samples of the reconstructed block are reconstructed according to encoded prediction information. In some examples, the reconstructed block corresponds to the block (960) in FIG. 9 or block (1160) in FIG. 11. In some examples, the reconstructed samples of the reconstructed block can be generated using the system or encoders illustrated in FIGS. 3, 5, and 6.

At (S1320), whether a current sub-block in a current block of the picture is to be coded using intra block copy (IBC) based on a reference sub-block in the reconstructed block is determined. If it is determined that the current sub-block is to be coded using IBC, the process proceeds to (S1330). Otherwise, the current sub-block can be coded using a process not fully described in this disclosure, and the process proceeds to (S1399) and terminates for the purposes of coding using IBC mode.

At (S1330), a range of reconstructed samples stored in the memory that are not overwritten (or not otherwise indicated as overwritten) is determined based on at least a position of the current sub-block. In some examples, the range of reconstructed samples stored in the memory can be determined as overwritten or not as illustrated described above, for example with reference to FIGS. 9-11. In some examples, the reconstructed samples of the reconstructed block can be generated using the system or encoders illustrated in FIGS. 3, 5, and 6.

At (S1340), a reference sub-block within the range of reconstructed samples that are not indicated as overwritten is determined. At (S1350), reconstructed samples of the current sub-block are generated based on the reconstructed samples of the reference sub-block. At (S1360), the reconstructed samples of a collocated sub-block in the reconstructed block stored in the memory are overwritten with the generated reconstructed samples of the current sub-block. In some examples, the reconstructed samples of the reconstructed block can be generated using the system or encoders illustrated in FIGS. 3, 5, and 6.

After (S1360), the process proceeds to (S1399) and terminates.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
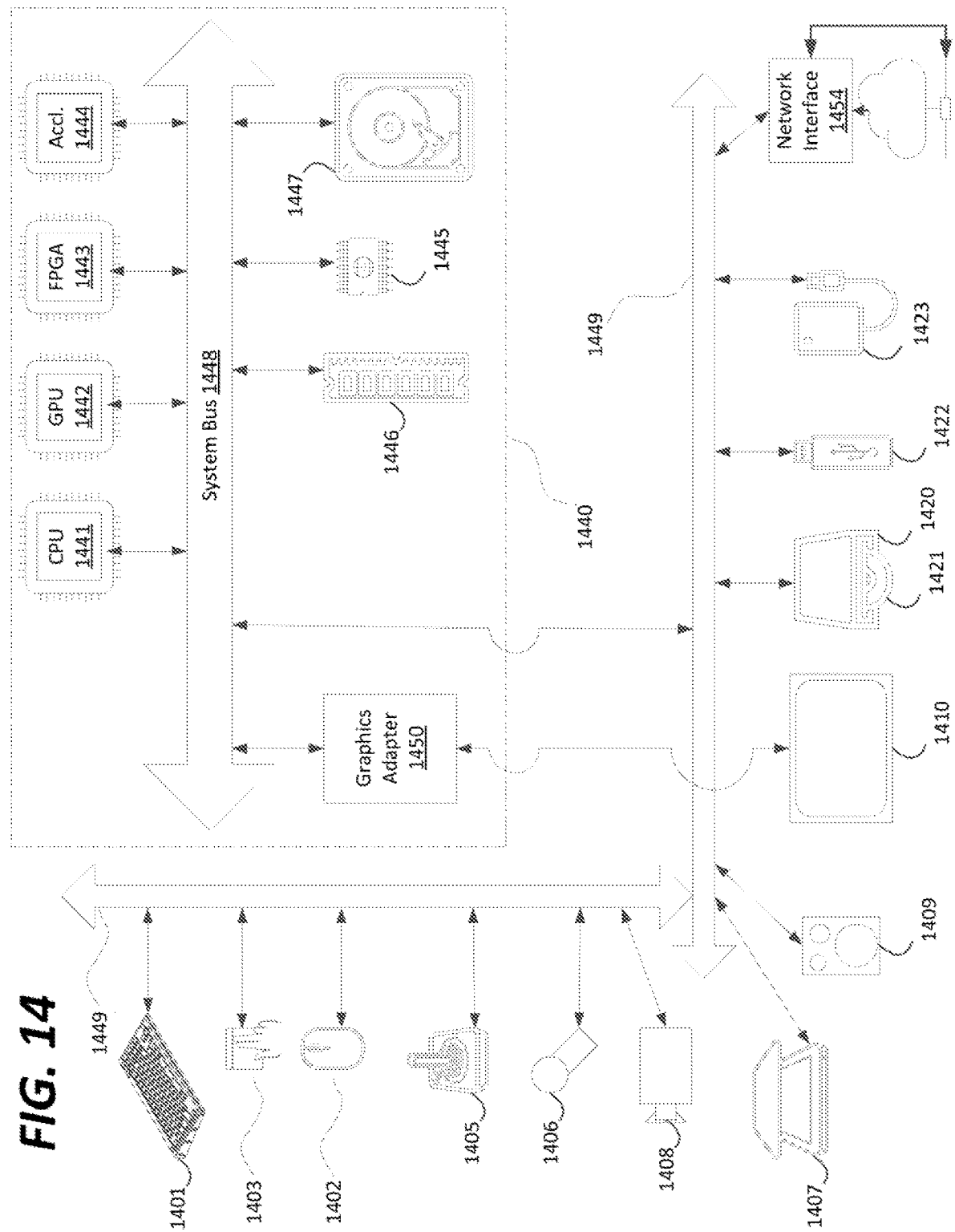
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
IBC: Intra Block Copy
CPR: Current Picture Referencing
BV: Block Vector
AMVP: Advanced Motion Vector Prediction
HEVC SCC: HEVC Screen Content Coding
DPB: Decoded Picture Buffer While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, comprising:
    identifying a reference sub-block in a previously reconstructed block of a picture;
    determining whether reconstructed samples of the reference sub-block are available based on a comparison of a first value and a second value, the first value being based on a position of a top-left sample of a current sub-block in a current block relative to a top-left sample of the picture and the second value being based on a position covered by the reference sub-block, the availability of the reconstructed samples of the reference sub-block being indicative of whether the reference sub-block is overwritten in a memory; and
    encoding the current sub-block block based on the reconstructed samples of the reference sub-block block in response to the reference sub-block block being determined as available, the determination that the reconstructed samples of the reference sub-block is available being indicative that the reconstructed samples of the reference sub-block are not overwritten in the memory.

2. The method of claim 1, wherein
    the current block includes a current partition in which the current sub-block is located,
    the previously reconstructed block includes a collocated partition that is collocated with the current partition, and
    the determining whether the reconstructed samples of the reference sub-block are available comprises determining that the reconstructed samples of the reference sub-block is not available based on the reference sub-block at least partially overlapping the collocated partition of the previously reconstructed block.

3. The method of claim 2, wherein the determining whether the reconstructed samples of the reference sub-block are available comprises determining that the reconstructed samples of the reference sub-block are not available based on the reference sub-block at least partially overlapping another partition of the previously reconstructed block that is arranged prior to the collocated partition according to a coding order of partitions of the current block.

4. The method of claim 1, wherein
    the current block includes first partitions,
    the previously reconstructed block includes second partitions that are collocated with the first partitions of the current block, respectively, and
    the determining whether the reconstructed samples of the reference sub-block are available is performed based on whether the reference sub-block at least partially overlaps one of the second partitions of the previously reconstructed block that is collocated with the current sub-block.

5. The method of claim 4, further comprising:
    identifying, from the first partitions, a current partition in which the current sub-block is located,
    wherein the reconstructed samples of the reference sub-block are determined to be unavailable based on the reference sub-block being included in one of the second partitions that is collocated with the current partition and one or more of the second partitions that are collocated with one or more of the first partitions encoded prior to the current partition.

6. The method of claim 5, wherein
    the first partitions include an upper-left partition, an upper-right partition, a lower-left partition, and a lower-right partition, and
    the first partitions are coded according to a coding order of the upper-left partition, the upper-right partition, the lower-left partition, and the lower-right partition.

7. The method of claim 5, wherein
    the first partitions include an upper-left partition, an upper-right partition, a lower-left partition, and a lower-right partition, and
    the first partitions are coded according to a coding order of the upper-left partition, the lower-left partition, the upper-right partition, and the lower-right partition.

8. The method of claim 1, wherein
    the current block corresponds to a first coding tree unit (CTU), and
    the previously reconstructed block corresponds to a second CTU that is immediately prior to the first CTU according to a coding order of the picture.

9. The method of claim 1, wherein
    the current block corresponds to a first coding tree unit (CTU),
    the previously reconstructed block corresponds to a second CTU that is immediately prior to a third CTU according to a coding order of the picture, and
    the third CTU is immediately prior to the first CTU according to the coding order of the picture.

10. A method for video decoding in a decoder, comprising:
    determining a current sub-block in a current block of a picture is to be reconstructed using intra block copy (IBC) based on a reference sub-block in the reconstructed block;
    determining whether reconstructed samples of the reference sub-block stored in a memory are available based on a comparison of a first value and a second value, the first value being based on a position of a top-left sample of the current sub-block in the current block relative to a top-left sample of the picture and the second value being based on a position covered by the reference sub-block, the availability of the reconstructed samples of the reference sub-block being indicative of whether the reference sub-block is overwritten;

generating reconstructed samples of the current sub-block for output based on the reconstructed samples of the reference sub-block when the reconstructed samples of the reference sub-block stored in the memory are determined to be available, the determination that the reconstructed samples of the reference sub-block is available being indicative that the reconstructed samples of the reference sub-block are not overwritten; and overwriting reconstructed samples of a collocated sub-block in the reconstructed block stored in the memory with the generated reconstructed samples of the current sub-block.

11. The method of claim 10, wherein the current block includes one or more non-overlapping partitions, including a current partition in which the current sub-block is located, the reconstructed block includes one or more non-overlapping partitions that are collocated with the one or more partitions of the current block, respectively, and the determining whether the reconstructed samples of the reference sub-block stored in a memory are available includes determining the reconstructed samples of the reference sub-block stored in the memory are available when the partition in the reconstructed block that includes the reference sub-block is collocated with one of the partitions in the current block that has not been reconstructed.

12. The method of claim 11, wherein the determining is performed based on a decoding order of the one or more non-overlapping partitions in the current block.

13. The method of claim 11, wherein the current block has a size of 128×128 luma samples, and the one or more partitions of the current block includes four partitions each having a size of 64×64 luma samples.

14. The method of claim 11, wherein the one or more partitions of the current block includes only one partition that is a size of the current block.

15. The method of claim 11, wherein each of the one or more partitions of the current block has a size that is equal to or greater than a maximum reference sub-block size used in the IBC.

16. The method of claim 10, wherein the current block includes upper-left, upper-right, lower-left, and lower-right partitions, the reconstructed block includes upper-left, upper-right, lower-left, and lower-right partitions, and the determining includes determining the reconstructed samples of the reference sub-block stored in the memory are available when the current sub-block is located in the upper-left partition in the current block, and the reference sub-block is located in one of the upper-right, lower-left, and lower-right partitions in the reconstructed block.

17. The method of claim 16, wherein the determining further includes determining the reconstructed samples of the reference sub-block stored in the memory are available when the current sub-block is located in the one of the upper-left, upper-right, and lower-left partitions in the current block, and the reference sub-block is located in the lower-right partition in the reconstructed block.

18. The method of claim 16, wherein the determining further includes:

determining the reconstructed samples of the reference sub-block stored in the memory are available when the current sub-block is located in the upper-right partition in the current block, the reference sub-block is located in the lower-left partition in the reconstructed block, and no reconstructed sample in the lower-left partition in the current block has been generated; and determining the reconstructed samples of the reference sub-block stored in the memory are available when the current sub-block is located in the lower-left partition in the current block, the reference sub-block is located in the upper-right partition in the reconstructed block, and no reconstructed sample in the upper-right partition in the current block has been generated.

19. The method of claim 16, wherein the determining further includes:

determining the reconstructed samples of the reference sub-block stored in the memory are available only when the current sub-block is located in the upper-left partition in the current block, and the reference sub-block is located in the lower-right partition in the reconstructed block.

20. A method of processing visual media data, the method comprising:

performing a conversion between a visual media file and a bitstream of visual media data according to a format rule, wherein the bitstream includes at least one syntax element that indicates a current sub-block in a current block of a picture is to be reconstructed using intra block copy (IBC) based on a reference sub-block in the reconstructed block, and the format rule specifies that availability of reconstructed samples of the reference sub-block stored in a memory are based on a first value and a second value, the first value being based on a position of a top-left sample of the current sub-block in the current block relative to a top-left sample of the picture and the second value being based on a position covered by the reference sub-block, the availability of the reconstructed samples of the reference sub-block being indicative of whether the reference sub-block is overwritten, reconstructed samples of the current sub-block for output are generated based on the reconstructed samples of the reference sub-block when the reconstructed samples of the reference sub-block stored in the memory are determined to be available, the determination that the reconstructed samples of the reference sub-block is available being indicative that the reconstructed samples of the reference sub-block are not overwritten.

* * * * *